(12) United States Patent
Saito et al.

(10) Patent No.: US 7,039,826 B2
(45) Date of Patent: *May 2, 2006

(54) CIRCUIT FOR CONTROLLING THE CLOCK SUPPLIED TO A STATE CONTROLLER IN A DATA TRANSFER CONTROL DEVICE ACCORDING TO STATES OF FIRST AND SECOND DEVICES

(75) Inventors: Nobuyuki Saito, Sapporo (JP); Hiroaki Shimono, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 418 days.

This patent is subject to a terminal disclaimer.

(21) Appl. No.: 10/379,686

(22) Filed: Mar. 6, 2003

(65) Prior Publication Data

US 2004/0083400 A1    Apr. 29, 2004

(30) Foreign Application Priority Data

Apr. 26, 2002 (JP) .............................. 2002-127159

(51) Int. Cl.
    G06F 1/04 (2006.01)

(52) U.S. Cl. ..................... 713/601; 713/322; 713/323; 713/600

(58) Field of Classification Search ................ 713/100, 713/320, 322, 323, 324, 600, 601
See application file for complete search history.

(56) References Cited

U.S. PATENT DOCUMENTS 5,784,581 A * 7/1998 Hannah ...................... 710/110

FOREIGN PATENT DOCUMENTS

JP    A-2000-116887    4/2000

(Continued)

OTHER PUBLICATIONS

"Microsoft Computer Dictionary", 2002, Microsoft Corporation, Fifth Edition, p. 76.*
U.S. Appl. No. 10/376,548, filed Mar. 4, 2003, Saito et al.

(Continued)

Primary Examiner—Lynne H. Browne
Assistant Examiner—Paul Yanchus
(74) Attorney, Agent, or Firm—Oliff & Berridge, PLC

(57) ABSTRACT

In a clock generating circuit, clocks generated therein are distributed by a clock distribution control circuit for every circuit block. In a clock output control circuit, a clock command is decoded by a clock command decoder and output of the clocks is controlled for every circuit block. A data transfer control device having a clock control circuit functions as a first device or a second device to transfer data as a host or a peripheral. When the data transfer control device function as a second device and in an idle state, it controls clock output to a state controller which controls switching between a host function and a peripheral function.

19 Claims, 32 Drawing Sheets

U.S. PATENT DOCUMENTS

| | | | | |
|---|---|---|---|---|
| 5,787,297 | A | * | 7/1998 | Lin .......................... 713/322 |
| 5,996,083 | A | * | 11/1999 | Gupta et al. ................ 713/322 |
| 6,516,205 | B1 | * | 2/2003 | Oguma ....................... 455/557 |
| 6,546,496 | B1 | * | 4/2003 | Wang et al. ................ 713/322 |
| 6,772,354 | B1 | * | 8/2004 | Takenaka et al. ........... 713/310 |

FOREIGN PATENT DOCUMENTS

| | | |
|---|---|---|
| JP | A-2000-183894 | 6/2000 |
| JP | A-2000-196648 | 7/2000 |
| JP | A-2001-202155 | 7/2001 |
| JP | A-2001-238190 | 8/2001 |
| JP | A-2002-091603 | 3/2002 |
| JP | A-2002-091608 | 3/2002 |

OTHER PUBLICATIONS

U.S. Appl. No. 10/379,727, filed Mar. 6, 2003, Saito et al.

Saito, "OTG Controller LSI Taking Reduction of CPU Load into Consideration", Design Wave Magazine, Apr. 2002, pp. 82-88.

* cited by examiner

FIG. 1A
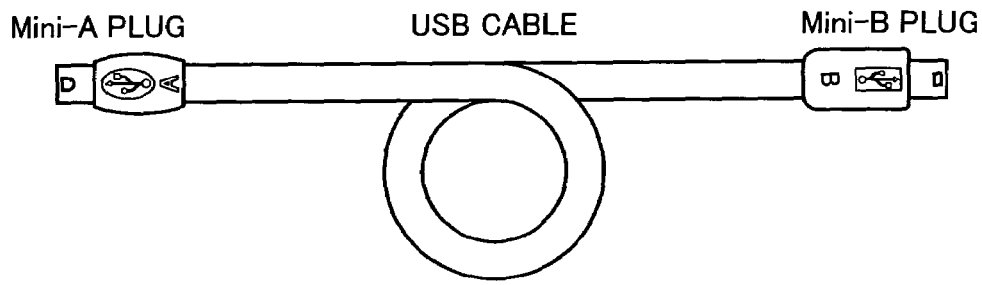
FIG. 1B
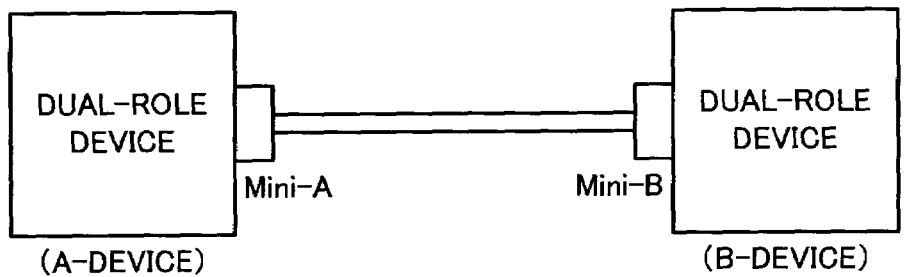
FIG. 1C
| PIN NUMBER | SIGNAL NAME |
|---|---|
| 1 | VBUS |
| 2 | D- |
| 3 | D+ |
| 4 | ID |
| 5 | GND |

FIG. 13

| | OTG CONTROLLER + CPU I/F + HC/PC SWITCH CIRCUIT | DMA HANDLER | BUFFER CONTROLLER | PACKET BUFFER Main | REGISTER SECTION | HC | PC | Xcvr | CLOCK CONTROL PATTERN |
|---|---|---|---|---|---|---|---|---|---|
| a_idle | Yes | | | No | | No | No | No | Wait |
| a_wait_vrise | Yes | | | No | | No | No | No | Wait |
| a_wait_bcon | Yes | | | No | | No | No | No | Wait |
| a_host | Yes | | | Yes | | Yes | No | Yes | Host |
| a_suspend | Yes | | | No | | No | No | No | Wait |
| a_peripheral | Yes | | | Yes | | No | Yes | Yes | Peripheral |
| a_wait_vfall | Yes | | | No | | No | No | No | Wait |
| a_vbus_err | Yes | | | No | | No | No | No | Wait |
| b_idle | No | | | No | | No | No | No | AllSleep |
| b_srp_init | Yes | | | No | | No | No | No | Wait |
| b_peripheral | Yes | | | Yes | | No | Yes | Yes | Peripheral |
| b_peripheral (when USB is suspended) | No | | | No | | No | No | No | AllSleep |
| b_wait_acon | Yes | | | Yes | | No | Yes | Yes | Peripheral |
| b_host | Yes | | | Yes | | Yes | No | Yes | Host |
| (Test) | Yes | | | Yes | | Yes | Yes | Yes | AllActive |

A-DEVICE: a_idle through a_vbus_err
B-DEVICE: b_idle through b_host

CLOCK CONTROL WHEN A-DEVICE TRANSITIONS FROM B-DEVICE DETECTION WAIT STATE (Wait MODE) TO HOST STATE (Host MODE)

FIG. 24

| REGISTER | bit7 | bit6 | bit5 | bit4 | bit3 | bit2 | bit1 | bit0 |
|---|---|---|---|---|---|---|---|---|
| CLOCK MONITOR REGISTER | | | | | CPUClkActive | PLLClkActive | EnPLL | EnOSC |
| CLOCK CONTROL REGISTER | OSCWakeUpTime[1:0] | | PLLWakeUpTime[1:0] | | HCSleep | PCSleep | MainSleep | XcvrSleep |
| CLOCK COMMAND REGISTER | ClkCmd[7:0] | | | | | | | | though
CIRCUIT FOR CONTROLLING THE CLOCK SUPPLIED TO A STATE CONTROLLER IN A DATA TRANSFER CONTROL DEVICE ACCORDING TO STATES OF FIRST AND SECOND DEVICES Japanese Patent Application No. 2002-127159, filed on Apr. 26, 2002, is hereby incorporated by reference in its entirety.

BACKGROUND OF THE INVENTION

The present invention relates to a clock control circuit, a data transfer control device, and electronic equipment.

In recent years, the USB (Universal Serial Bus) standard has attracted attention as an interface standard for connecting a personal computer with a peripheral device (electronic equipment in a broad sense). However, data transfer according to the USB standard cannot be performed between peripheral devices without an intermediate host. Therefore, the "USB On-The-Go (OTG) 1.0" standard (hereinafter abbreviated as "OTG standard") has been provided as a supplemental standard to the USB 2.0 standard, and has enabled data transfer according to the USB standard to be performed between peripheral devices.

In the OTG standard, a peripheral which operates as a device in the USB standard is allowed to have a host function necessary for operating as a host. This enables peripheral devices, which are devices in the conventional USB standard, to be connected, whereby data can be transferred without an intermediate host in the conventional USB standard.

BRIEF SUMMARY OF THE INVENTION

According to a first aspect of the present invention, there is provided a clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:

a clock generating circuit which generates a clock for every circuit block of the data transfer control device; and a clock output control circuit which generates an output control signal which controls output of the clock for every circuit block, wherein the clock output control circuit suspends output of the clock to be supplied to the state controller or reduces a clock frequency based on the output control signal in an idle state of the second device.

According to a second aspect of the present invention, there is provided a clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:

a clock generating circuit which generates a clock for every circuit block of the data transfer control device; and a clock output control circuit which generates an output control signal which controls output of the clock for every circuit block, wherein:

the clock output control circuit suspends output of the clock to be supplied to the state controller or reduces a clock frequency based on the output control signal when data transfer from a connection partner is suspended in the state transition of the second device as a peripheral; and the clock output control circuit omits the control of clock output to the state controller in a suspend state of the first device.

According to a third aspect of the present invention, there is provided a clock control circuit comprising:

a clock generating circuit which generates a clock for every circuit block; and a clock output control circuit which generates an output control signal which controls output of the clock for every circuit block;

wherein the clock output control circuit controls output of the clock for every circuit block by using the output control signal generated based on a clock control pattern which indicates whether or not to suspend output of every clock supplied for each block circuit, or whether or not to reduce the clock frequency.

According to a fourth aspect of the present invention, there is provided a clock control circuit of a data transfer control device having a state controller which controls switching between states according to the Universal Serial Bus (USB) On-The-Go (OTG) standard, the clock control circuit comprising:

a clock generating circuit which generates a clock for every circuit block of the data transfer control device; and a clock output control circuit which generates an output control signal which controls output of the clock for every circuit block, wherein the clock output control circuit suspends output of the clock to be supplied to the state controller or reduces a clock frequency based on the output control signal in an idle state of the B-device defined by the USB OTG standard.

According to a fifth aspect of the present invention, there is provided a clock control circuit of a data transfer control device having a state controller which controls switching between states according to the Universal Serial Bus (USB) On-The-Go (OTG) standard, the clock control circuit comprising:

a clock generating circuit which generates a clock for every circuit block of the data transfer control device; and a clock output control circuit which generates an output control signal which controls output of the clock for every circuit block, wherein:

the clock output control circuit suspends output of the clock to be supplied to the state controller or reduces a clock frequency based on the output control signal when data transfer from a connection partner is suspended in the operation of the B-device as a peripheral defined by the USB OTG standard; and the clock output control circuit omits the control of clock output to the state controller in a suspend state of the A-device of the USB OTG standard.

BRIEF DESCRIPTION OF THE SEVERAL VIEWS OF THE DRAWING

FIG. 1A is a schematic view showing an outline of a USB cable having a Mini-A plug and a Mini-B plug on opposite ends; FIG. 1B is a diagram for illustrating an A-device and a B-device; and FIG. 1C is a terminal table.

FIG. 13 is a table showing an example of clock control pattern.

FIG. 24 is an example of a register map of a clock monitor register, a clock control register, and a clock command register.

DETAILED DESCRIPTION OF THE EMBODIMENT

Figure 2:
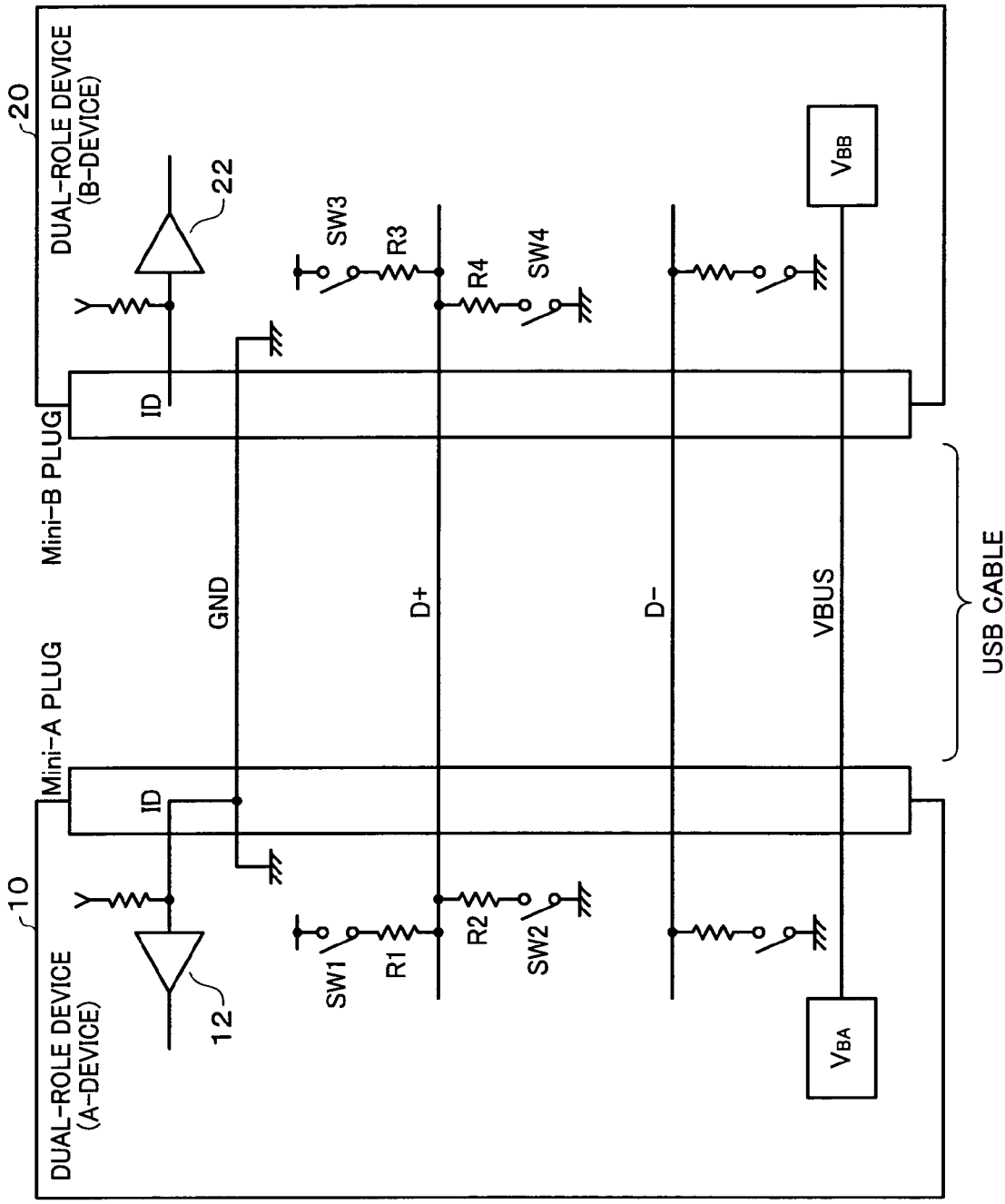
FIG. 2 is a diagram schematically showing an example of dual-role devices to which a USB cable is connected.

Embodiments of the present invention are described below. Note that the embodiments described hereunder do not in any way limit the scope of the invention laid out in the claims herein. In addition, all elements of the embodiments described below should not be taken as essential requirements of the present invention.

The OTG standard defines a dual-role device. The dual-role device can operate as a host or a peripheral. The dual-role device is controlled by state transition defined in the OTG standard, for example. Therefore, a number of states are defined in the OTG standard, and it is necessary to control generation or detection of the signal state corresponding to each state.

These states use different functional blocks, so a clock is supplied not only to a block in use, but also to an unused functional block, increasing power consumption. Therefore, it is desirable to reduce power consumption by controlling clock supply in units of a given number of blocks. However, if used functional blocks are sorted from unused functional blocks in the clock supply control after state transition, processing is made complicated since there are quite a number of states. Moreover, clocks are supplied in different timings in the states, so if a clock is supplied after a predetermined procedure after state transition and the clock supply is controlled by hardware, for example, circuit size is increased.

According to the following embodiments, there are provided a clock control circuit, a data transfer control device, and electronic equipment in which power consumption is reduced by simplifying clock supply control.

According to one embodiment of the present invention, there is provided a clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:

a clock generating circuit which generates a clock for every circuit block of the data transfer control device; and a clock output control circuit which generates an output control signal which controls output of the clock for every circuit block, wherein the clock output control circuit suspends output of the clock to be supplied to the state controller or reduces a clock frequency based on the output control signal in an idle state of the second device.

The first device is a device which operates as a host in a default state, or a device which transfers data by its own power supply (or self power supply) without using a power supply from a partner for data transfer. The second device may be referred to as a device which operates as a peripheral in a default state. The second device may also be referred to as a device which transfers data by using its own power supply or a power supply from a connection partner for data transfer (or bus power supply). For example, a device may be set to either the first device or the second device before transferring data.

The host is a function of a device having the initiative for data transfer control. The peripheral is a function of a device which does not have the initiative for data transfer control and follows instructions from the host.

According to this embodiment, in the data transfer control device having a state controller which controls switching between a host state and a peripheral state on the basis of state transition of a first device which operates as a host in a default state, or state transition of a second device which operates as a peripheral in a default state, the clock generation circuit generates a clock for every circuit block, and output of the clock is controlled for every circuit block. Since the first device controls data transfer as the host, the clock is preferably supplied to the state controller even in the idle state. On the other hand, since the second device operates as the peripheral in the default state, the second device cannot transfer data without instructions from the host in the idle state, leading to the unnecessary power consumption. Therefore, unnecessary power consumption can be reduced by suspending output of the clock supplied to the state controller or by reducing the frequency of the clock in the idle state of the second device.

In this clock control circuit, the clock output control circuit may omit the control of clock output to the state controller in the state transition of the first device.

In this embodiment, a clock is supplied to the state controller in order to make the first device operate as the host. Therefore, switching between the host state and the peripheral state can be controlled while reducing power consumption as described above.

In this clock control circuit, the clock output control circuit may suspend output of the clock to be supplied to a host controller which controls host operation or reduce the clock frequency, and also the clock output control circuit may suspend output of the clock to be supplied to a peripheral controller which controls peripheral operation or reduce the clock frequency in an idle state of the second device.

In this embodiment, since the host controller and the peripheral controller are not operated in the idle state of the second device, unnecessary power consumption can be reduced.

According to one embodiment of the present invention, there is provided a clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:

a clock generating circuit which generates a clock for every circuit block of the data transfer control device; and a clock output control circuit which generates an output control signal which controls output of the clock for every circuit block, wherein:

the clock output control circuit suspends output of the clock to be supplied to the state controller or reduces a clock frequency based on the output control signal when data transfer from a connection partner is suspended in the state transition of the second device as a peripheral; and the clock output control circuit omits the control of clock output to the state controller in a suspend state of the first device.

In this embodiment, if data transfer from the connection partner is suspended when the second device is operating as the peripheral, unwanted operation of the state controller can be prevented since the second device cannot control data transfer without instruction from the connection partner. The data transfer control device must control switching between the states as the host in the suspend state of the first device. Therefore, switching between the host state and the peripheral state can be controlled while reducing unnecessary power consumption.

In this clock control circuit, the clock output control circuit may suspend output of the clock to be supplied to a peripheral controller which controls peripheral operation or reduce the clock frequency based on the output control signal in the suspend state of the first device.

In this embodiment, unwanted power consumption in the peripheral controller can be reduced by suspending the clock output to the peripheral controller or by reducing the clock frequency when the first device operates as the host.

In this clock control circuit, the clock output control circuit may suspend output of the clock to be supplied to a host controller which controls host operation or reduce the clock frequency based on the output control signal when the data transfer control device operates as a peripheral; and the clock output control circuit may suspend output of the clock to be supplied to a peripheral controller which controls peripheral operation or reduce the clock frequency based on the output control signal when the data transfer control device operates as a host.

In this embodiment, switching between the host state and the peripheral state can be controlled, so unwanted power consumption in the exclusively controlled circuit blocks can be reduced by suspending the operation of the peripheral controller when operating as the host, and suspending the operation of the host controller when operating as the peripheral.

In this clock control circuit, the clock output control circuit may generate the output control signal based on a clock control pattern which indicates whether or not to suspend output of every clock supplied to each circuit block of the data transfer control device, or whether or not to reduce the clock frequency.

In this embodiment, the output control signal is generated based on the clock control pattern, so sorting of clocks to be controlled is not required after state transition, enabling to simplify the processing.

In this clock control circuit, the clock output control circuit may have a clock command register in which a clock command corresponding to the clock control pattern is set, and a clock monitor register for monitoring contents in the clock command register; and the output control signal may be generated based on decoding results of the clock command in the clock command register.

In this embodiment, clock control using the clock control pattern can be implemented by a simple circuit.

In this clock control circuit, the clock command may be generated according to a state transitioned by the state controller.

In this embodiment, processing can be simplified by specifying the clock control pattern according to the host state or the peripheral state of the first and second devices.

In this clock control circuit, the first device may be the A-device in the Universal Serial Bus (USB) On-The-Go (OTG) standard; the second device may be the B-device in the USB OTG standard; and the state controller may control switching between the host state and the peripheral state according to the USB OTG standard.

In this embodiment, power consumption caused by USB transfer in portable devices in conformity to the USB OTG standard can be reduced by simple processing.

According to one embodiment of the present invention, there is provided a clock control circuit comprising:

a clock generating circuit which generates a clock for every circuit block; and a clock output control circuit which generates an output control signal which controls output of the clock for every circuit block;

wherein the clock output control circuit controls output of the clock for every circuit block by using the output control signal generated based on a clock control pattern which indicates whether or not to suspend output of every clock supplied for each block circuit, or whether or not to reduce the clock frequency.

In this embodiment, the output control signal is generated based on the clock control pattern, so sorting of clocks to be controlled is not required after state transition, enabling to simplify the processing.

According to one embodiment of the present invention, there is provided a clock control circuit of a data transfer control device having a state controller which controls switching between states according to the Universal Serial Bus (USB) On-The-Go (OTG) standard, the clock control circuit comprising:

a clock generating circuit which generates a clock for every circuit block of the data transfer control device; and a clock output control circuit which generates an output control signal which controls output of the clock for every circuit block, wherein the clock output control circuit suspends output of the clock to be supplied to the state controller or reduces a clock frequency based on the output control signal in an idle state of the B-device defined by the USB OTG standard.

According to one embodiment of the present invention, there is provided a clock control circuit of a data transfer control device having a state controller which controls switching between states according to the Universal Serial Bus (USB) On-The-Go (OTG) standard, the clock control circuit comprising:

a clock generating circuit which generates a clock for every circuit block of the data transfer control device; and a clock output control circuit which generates an output control signal which controls output of the clock for every circuit block, wherein:

the clock output control circuit suspends output of the clock to be supplied to the state controller or reduces a clock frequency based on the output control signal when data transfer from a connection partner is suspended in the operation of the B-device as a peripheral defined by the USB OTG standard; and the clock output control circuit omits the control of clock output to the state controller in a suspend state of the A-device of the USB OTG standard.

The state controller may control switching between states according to a standard developed from the USB OTG standard.

According to one embodiment of the present invention, there is provided a data transfer control device comprising:

any one of the above clock control circuits;

a state controller which controls switching between a host state and a peripheral state on the basis of state transition of a first device or a second device;

a host controller which controls host operation; and a peripheral controller which controls peripheral operation.

The data transfer control device according to this embodiment is capable of reducing power consumption by simplifying processing.

According to one embodiment of the present invention, there is provided electronic equipment comprising:

the above data transfer control device; and a device which performs output processing, fetch processing, or storage processing of data transferred through the data transfer control device and a bus.

The electronic equipment according to this embodiment has a data transfer control device in which power consumption is reduced by simplifying processing.

The embodiments of the present invention are described below in detail with reference to the drawings.

1. OTG (On-The-Go) Standard 1.1 A-Device and B-Device

The OTG standard is briefly described below.

The USB (Universal Serial Bus) standard is a standard for transferring data between a host (personal computer, for example) and one or more peripherals (peripheral devices, for example). Data transfer is controlled by the host. The amount of data processed in portable equipment and the like which are peripherals in the USB standard has been increased. Therefore, a demand for transferring data according to the USB standard without an intermediate host while consuming only a small amount of power has been increased.

In view of such a situation, the OTG standard has been provided as a supplemental standard to the USB 2.0 standard. In the OTG standard, small-sized connectors, a dual-role device which allows a peripheral to have a host function necessary for operating as a host, and the like are newly standardized.

In the case of performing data transfer according to the OTG standard, a host and a peripheral are connected by a USB cable to which a Mini-A plug and a Mini-B plug are provided on opposite ends, as shown in FIG. 1A. The Mini-A plug has a structure which allows insertion into a Mini-A receptacle or a Mini-AB receptacle. The Mini-B plug has a structure which allows insertion into a Mini-B receptacle or a Mini-AB receptacle. A dual-role device must be equipped with a Mini-AB receptacle.

In the USB standard, a host and a peripheral can be connected only by using VBUS (power supply), GND (ground), and two data signal lines (D+ and D−). VBUS is supplied from the host. The data signal lines D+ and D− are used as differential signal lines.

In the OTG standard, a dual-role device to which a Mini-A plug is connected becomes an A-device, as shown in FIG. 1B. The A-device operates as the host at the start of a session and is capable of transferring the host function to a B-device under given conditions. A dual-role device to which a Mini-B plug is connected becomes a B-device. The B-device operates as the peripheral at the start of a session and is allowed to operate as the host by the A-device. The A-device supplies VBUS.

In the dual-role device, an ID terminal is defined in addition to the conventional terminals (VBUS, D−, D+, and GND) of the connector in order to detect the type of plug inserted into the Mini-AB receptacle, as shown in FIG. 1C. The ID terminal is connected with GND in the Mini-A plug and the ID terminal is in an open state in the Mini-B plug.

FIG. 2 schematically shows an example of dual-role devices to which a USB cable is connected.

A dual-role device 10 to which a Mini-A plug is connected and a dual-role device 20 to which a Mini-B plug is connected are connected through a USB cable. The dual-role devices 10 and 20 include ID detection circuits 12 and 22, respectively. Each of the ID detection circuits 12 and 22 pulls up a signal line electrically connected with the ID terminal and detects whether or not the ID terminal is grounded depending on the voltage of the signal line. The ID detection circuit 12 shown in FIG. 2 detects a Mini-A plug since the signal line connected with the ID terminal is grounded. The ID detection circuit 22 detects a Mini-B plug since the signal line connected with the ID terminal is pulled up.

The dual-role device 10 includes a pull-up resistor R1 for pulling up the data signal line D+ and a pull-down resistor R2 for pulling down the data signal line D+ in order to operate as either the host or the peripheral. The pull-up resistor R1 is connected with a power supply voltage line through a switch circuit SW1 for turning the pull-up on/off. The pull-down resistor R2 is connected with a ground line through a switch circuit SW2 for turning the pull-down on/off. The switch circuits SW1 and SW2 are controlled exclusively so that one of the switch circuits SW1 and SW2 is turned off when the other is turned on.

The dual-role device 20 includes a pull-up resistor R3 for pulling up the data signal line D+ and a pull-down resistor R4 for pulling down the data signal line D+. The pull-up resistor R3 is connected with a power supply voltage line through a switch circuit SW3 for turning the pull-up on/off. The pull-down resistor R4 is connected with a ground line through a switch circuit SW4 for turning the pull-down on/off. The switch circuits SW3 and SW4 are controlled exclusively so that one of the switch circuits SW3 and SW4 is turned off when the other is turned on.

In the dual-role devices 10 and 20, the data signal line D− is pulled low.

Since both the dual-role devices 10 and 20 can become the A-device, the dual-role devices 10 and 20 respectively include power supply control circuits VBA and VBB which supply current to VBUS. In FIG. 2, the dual-role device 10 supplies current to VBUS by the power supply control circuit VBA.

1.2 SRP (Session Request Protocol)

In the OTG standard, the A-device can suspend supply of current to VBUS when there is no bus activity. Therefore, unnecessary power consumption can be reduced if battery-powered portable equipment operates as the host, whereby power consumption can be reduced. In the case where the B-device starts a session in this state and transfers data, the B-device can request the A-device to supply current to VBUS according to the procedure called SRP. The session used herein refers to a period in which the voltage of VBUS is above a given threshold voltage.

Figure 3:
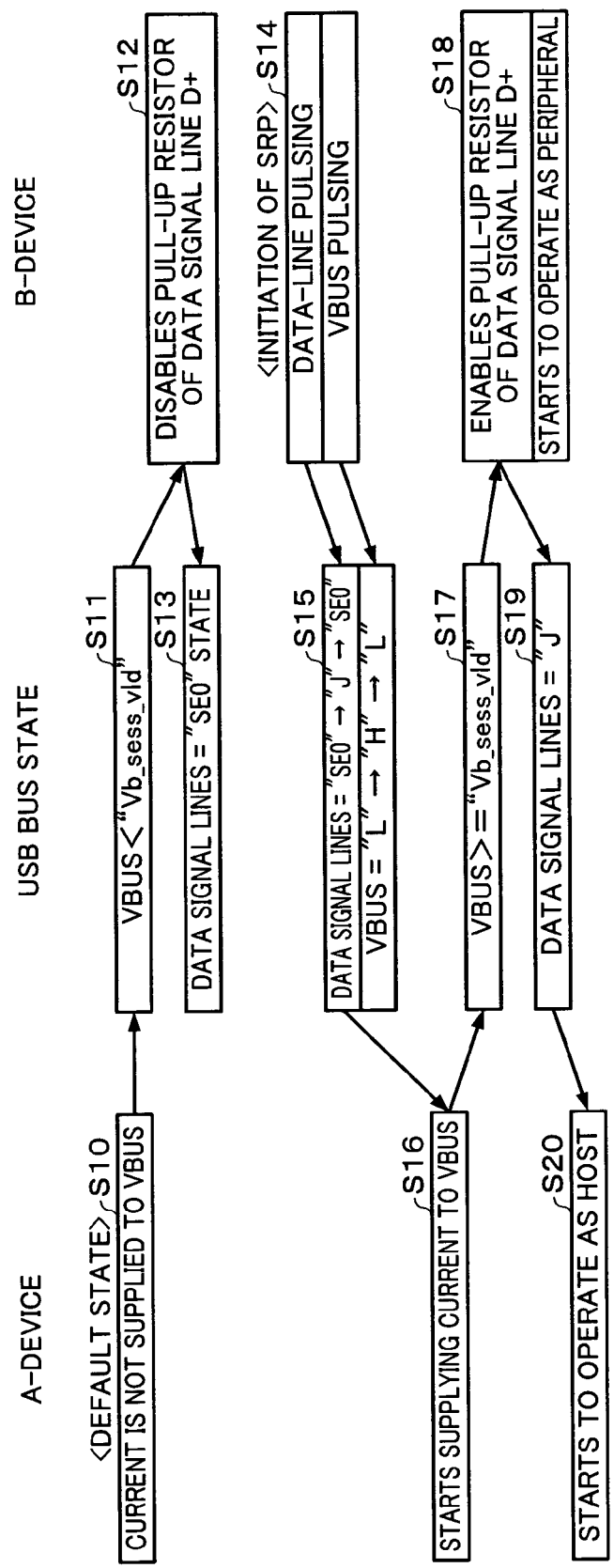
FIG. 3 is a diagram for illustrating SRP.

FIG. 3 is a diagram for illustrating the procedure for SRP in the FS (Full Speed) mode with reference to the configuration of the dual-role devices shown in FIG. 2.

In the FS mode, the data signal line D+ is pulled down in the host (switch circuit SW1 is turned off and switch circuit SW2 is turned on), and the data signal line D+ is pulled up in the peripheral (switch circuit SW3 is turned on and switch circuit SW4 is turned off).

When there is no bus activity and the A-device suspends supply of current to VBUS (S10), the voltage of VBUS drops below a "Vb_sess_vld" (B-DeviceSession Valid) level (S11). When the B-device detects that the voltage of VBUS drops below the "Vb_sess_vld" level, the B-device disables the pull-up resistor of the data signal line D+ by the switch circuit SW3 (S12). This allows the line state of the data signal lines to be in an "SE0" state (data signal line D+ is at "L" level and data signal line D− is at "L" level in the FS mode) (S13).

If the voltage of VBUS is lower than "Vb_sess_end" (B-Device Session End) and the "SE0" state continues for 2 ms or more, the B-device can initiate SRP. SRP can be performed by data line pulsing or VBUS pulsing. The data line pulsing is a method which causes the line state to transition to the "SE0" state, a "J" state (data signal line D+ is at "H" level and data signal line D− is at "L" level in the FS mode), and the "SE0" state in that order. The VBUS pulsing is a method which causes the voltage of VBUS to transition to an "L" level (less than Vb_sess_vld), an "H" level (higher than Va_sess_vld), and the "L" level in that order by allowing the B-device to supply current to VBUS (S14 and S15).

When the A-device detects that SRP is performed by either method by monitoring the voltages of the data signal lines or VBUS, the A-device starts supplying current to VBUS (S16). This allows the voltage of VBUS to be equal to or above "Vb_sess_vld" (S17).

When the B-device detects that the voltage of VBUS is equal to or above "Vb_sess_vld", the B-device enables the pull-up resistor of the data signal line D+ by the switch circuit SW3 (S18) to allow the line state to transition to the "J" state (S19), and starts to operate as the peripheral.

When the A-device detects that the line state is in the "J" state, the A-device starts to operate as the host (S20).

1.3 HNP (Host Negotiation Protocol)

In the OTG standard, a dual-role device becomes either the A-device or the B-device depending on the plug connected thereto. However, the host function and the peripheral function can be exchanged without plugging or unplugging. HNP is a procedure for exchanging the host function and the peripheral function.

Figure 4:
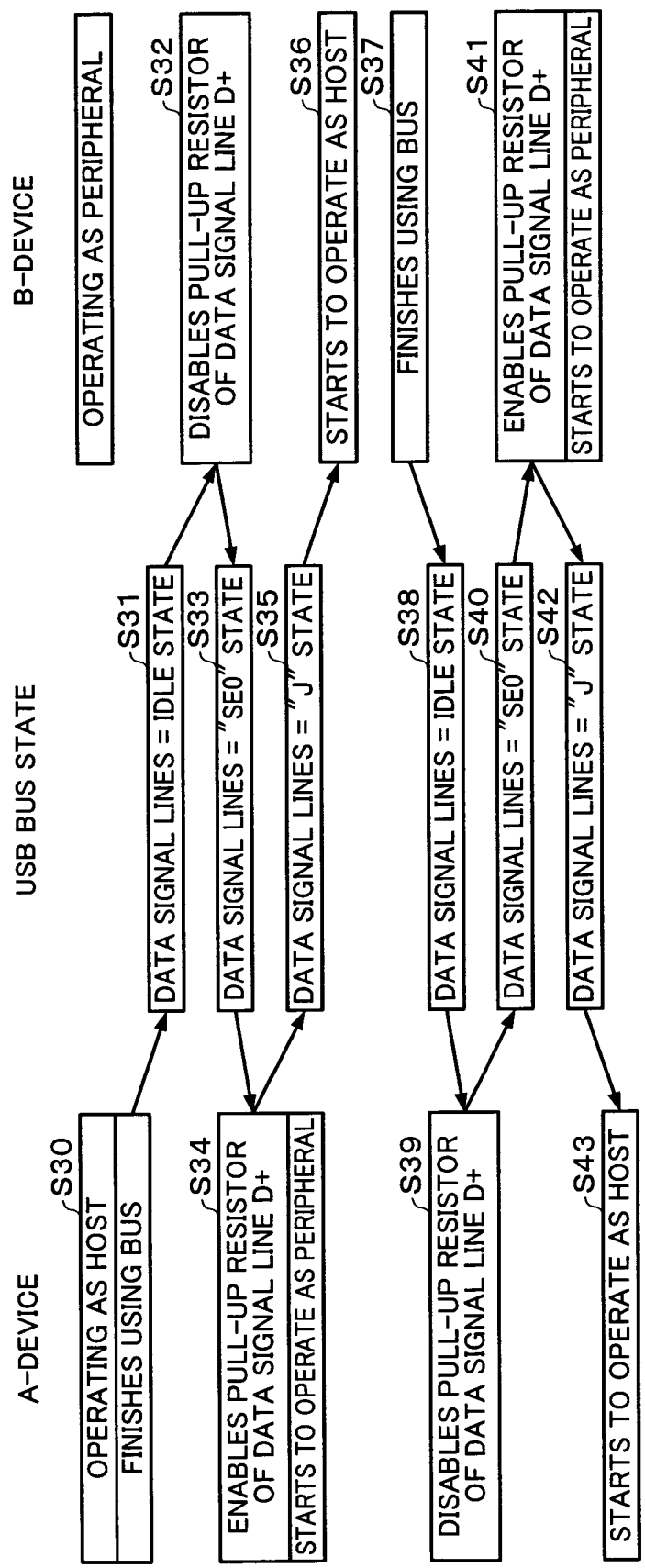
FIG. 4 is a diagram for illustrating HNP.

FIG. 4 is a diagram for illustrating the procedure for HNP in the FS mode with reference to the configuration of the dual-role devices shown in FIG. 2.

The following description is given on the assumption that the A-device operates as the host, the B-device operates as the peripheral, and HNP is enabled.

When the A-device finishes using the bus (S30), the A-device puts the line state in an idle state ("J" state in the FS mode) (S31).

When the B-device detects that the "J" state continues for 3 ms or more, the B-device disables the pull-up resistor of the data signal line D+ by the switch circuit SW3 (S32) to allow the line state to be in the "SE0" state (S33). When the A-device detects that the line state is in the "SE0" state, the A-device enables the pull-up resistor (disables the pull-down resistor) of the data signal line D+ by the switch circuit SW1 (S34). This allows the line state to be in the "J" state (S35), whereby the A-device starts to operate as the peripheral. The B-device detects that the line state is in the "J" state and starts to operate as the host (S36).

When the B-device as the host finishes using the bus (S37), the B-device allows the line state to be in the idle state by the switch circuits SW3 and SW4 (S38). The A-device detects that the line state is in the idle state and disables the pull-up resistor of the data signal line D+ (S39) to allow the line state to transition to the "SE0" state (S40). When the B-device detects that the line state is in the "SE0" state, the B-device enables the pull-up resistor (disables the pull-down resistor) of the data signal line D+ by the switch circuit SW3 (S41). This allows the line state to be in the "J" state (S42), whereby the B-device starts to operate as the peripheral. The A-device detects that the line state is in the "J" state and starts to operate as the host (S43).

Data transfer control by using such a protocol can be realized by allowing the A-device and the B-device to transition between states according to a transition condition.

The state transition of the A-device and the B-device is described below.

1.4 State Transition of A-device

Figure 5:
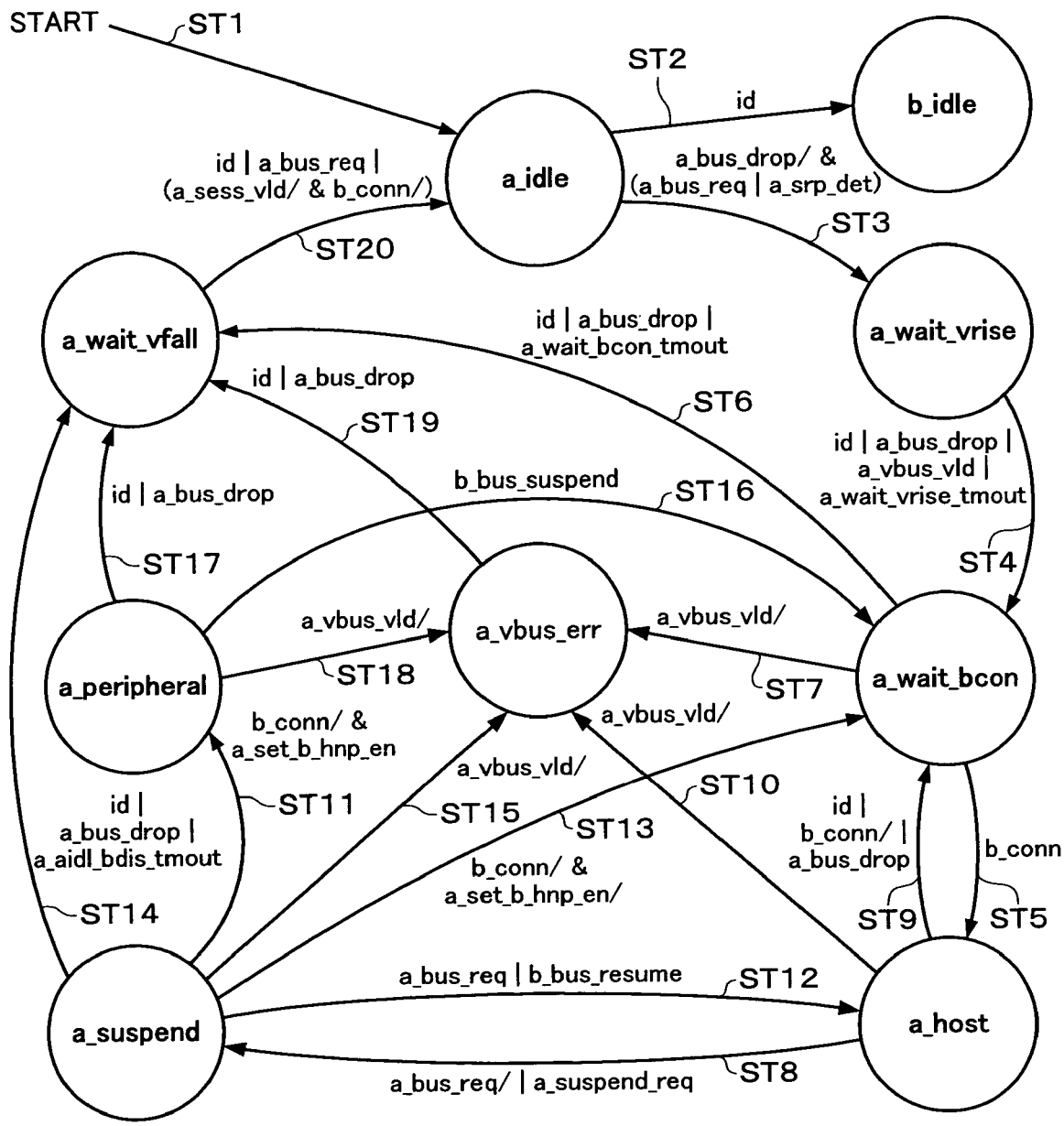
FIG. 5 is a diagram for illustrating state transition of an A-device.

FIG. 5 is a diagram for illustrating state transition of the A-device.

The a_idle state is the start state for the A-device (ST1).

If a Mini-A plug of the USB cable is not inserted into the Mini-AB receptacle of the dual-role device, the pulled-up ID terminal is at the "H" level (id), whereby the dual-role device transitions to the b_idle state (ST2). Specifically, the dual-role device defaults to a B-device. If a Mini-A plug is inserted, the ID terminal is at the "L" level (id/), whereby the dual-role device transitions to the a_idle state (ST1).

Supply of current to VBUS is suspended in the a_idle state. The pull-up of the data signal line D+ is disabled (turned off) (pull-down is enabled; in more detail, switch circuit SW1 is turned off and switch circuit SW2 is turned on). Therefore, the line state is in the "SE0" state. If the host application does not request dropping the voltage of VBUS (a_bus_drop/), and if the A-device wants to perform USB transfer (a_bus_req) or detects SRP from the B-device (a_srp_det), the A-device transitions to the a_wait_vrise state (ST3).

In the a_wait_vrise state, current starts to be supplied to VBUS and the voltage of VBUS rises. If the Mini-A plug is removed (id), if the host application requests dropping the voltage of VBUS (a_bus_drop), if the voltage of VBUS exceeds a given threshold voltage (a_vbus_vld), or if a predetermined period of time has elapsed in the a_wait_vrise state (a_wait_vrise_tmout), the A-device transitions to the a_wait_bcon state (ST4).

In the a_wait_bcon state, the pull-up of the data signal line D+ in the A-device is in an off state. If the pull-up of the data signal line D+ is enabled (turned on) by the B-device (switch circuit SW3 is turned on and switch circuit SW4 is turned off) to allow the data signal line D+ to be at the "H" level (line state is in the "J" state) (b_conn), the A-device transitions to the a_host state (ST5). If the Mini-A plug is removed (id), if the host application requests dropping the voltage of VBUS (a_bus_drop), or if a predetermined period of time has elapsed in the a_wait_bcon state (a_wait_bcon_tmout), the A-device transitions to the a_wait_vfall state (ST6). If the voltage of VBUS drops below the given threshold voltage (a_vbus_vld/), the A-device transitions to the a_vbus_err state (ST7).

Specifically, since the dual-role device defaults to a B-device, the data signal line D+ remains pulled down in the A-device until the a_wait_bcon state. When current starts to be supplied to VBUS in the a_wait_vrise state, the pull-up of the B-device is turned on. This allows the A-device in which the data signal line D+ is pulled down to operate as the host, and the B-device in which the data signal line D+ is pulled up to operate as the peripheral.

In the a_host state, the A-device operates as the host of the USB standard. In more detail, the A-device drives the data signal lines into the "SE0" state as a bus reset signal in order to enumerate the peripheral as the host. The peripheral is reset by allowing this state to continue for a given period of time. The host transfers configuration information, assigns an address, and the like by using control transfer, and starts USB transfer. In the a_host state, if the A-device as the host finishes using the bus (a_bus_req/), or if transition to the suspend state is requested (a_suspend_req), the A-device transitions to the a_suspend state (ST8). If the Mini-A plug is removed (id), if the line state is changed to the "SE0" state from the "J" state (b_conn/), or if the host application requests dropping the voltage of VBUS (a_bus_drop), the A-device transitions to the a_wait_bcon state (ST9). If the voltage of VBUS drops below the given threshold voltage (a_vbus_vld/) for some reason, the A-device transitions to the a_vbus_err state (ST10).

In the a_suspend state, issuance of SOF (Start Of Frame) packets is suspended. The B-device operates as the peripheral and remains in the b_peripheral state. If the A-device enables HNP by the B-device (a_set_b_hnp_en), and the pull-up is turned off in the B-device to put the line state in the "SE0" state (b_conn/), the A-device transitions to the a_peripheral state (ST 11). If the A-device wants to use the bus (a_bus_req), or if the B-device puts the line state in the "K" state (b_bus_resume), the A-device transitions to the a_host state (ST12). If the A-device disables HNP by the B-device (a_set_b_hnp_en/), and the pull-up is turned off in the B-device to put the line state in the "SE0" state (b_conn/), the A-device transitions to the a_wait_bcon state (ST13). If the Mini-A plug is removed (id), if the host application requests dropping the voltage of VBUS (a_bus_drop), or if a predetermined period of time has elapsed in the a suspend state (a_aidl_bdis_tmout), the A-device transitions to the a_wait_vfall state (ST14). If the voltage of VBUS drops below the given threshold voltage (a_vbus_vld/) for some reason, the A-device transitions to the a_vbus_err state (ST15).

In the a_peripheral state, since the pull-up is turned on in the A-device and the pull-up is turned off in the B-device by HNP enable from the A-device as described later, the A-device becomes the peripheral and the B-device becomes the host. If the B-device finishes using the bus such as in the case where the B-device as the host finishes data transfer (b_bus_suspend), the A-device transitions to the a_wait_bcon state (ST16). In the a_wait_bcon state, the pull-up of the A-device is turned off as described above. In the a_peripheral state, if the Mini-A plug is removed (id), or if the host application requests dropping the voltage of VBUS (a_bus_drop), the A-device transitions to the a_wait_vfall state (ST17). If the voltage of VBUS drops below the given threshold voltage (a_vbus_vld/) for some reason, the A-device transitions to the a_vbus_err state (ST18).

Since an overcurrent condition occurs in the a_bus_err state, firmware requests the A-device to drop the voltage of VBUS, for example. In the a_vbus_err state, if the Mini-A plug is removed (id), or if the host application requests dropping the voltage of VBUS (a_bus_drop), the A-device transitions to the a_wait_vfall state (ST19).

In the a_wait_vfall state, supply of current to VBUS is suspended. If the Mini-A plug is removed (id), if the A-device wants to use the bus (a_bus_req), or if the pull-up in the B-device is turned off in a state in which the voltage of VBUS is below the given threshold voltage (a_sess_vld/) to allow the line state to be in the "SE0" state (b_conn/), the A-device transitions to the a_idle state (ST20).

1.5 State Transition of B-device

Figure 6:
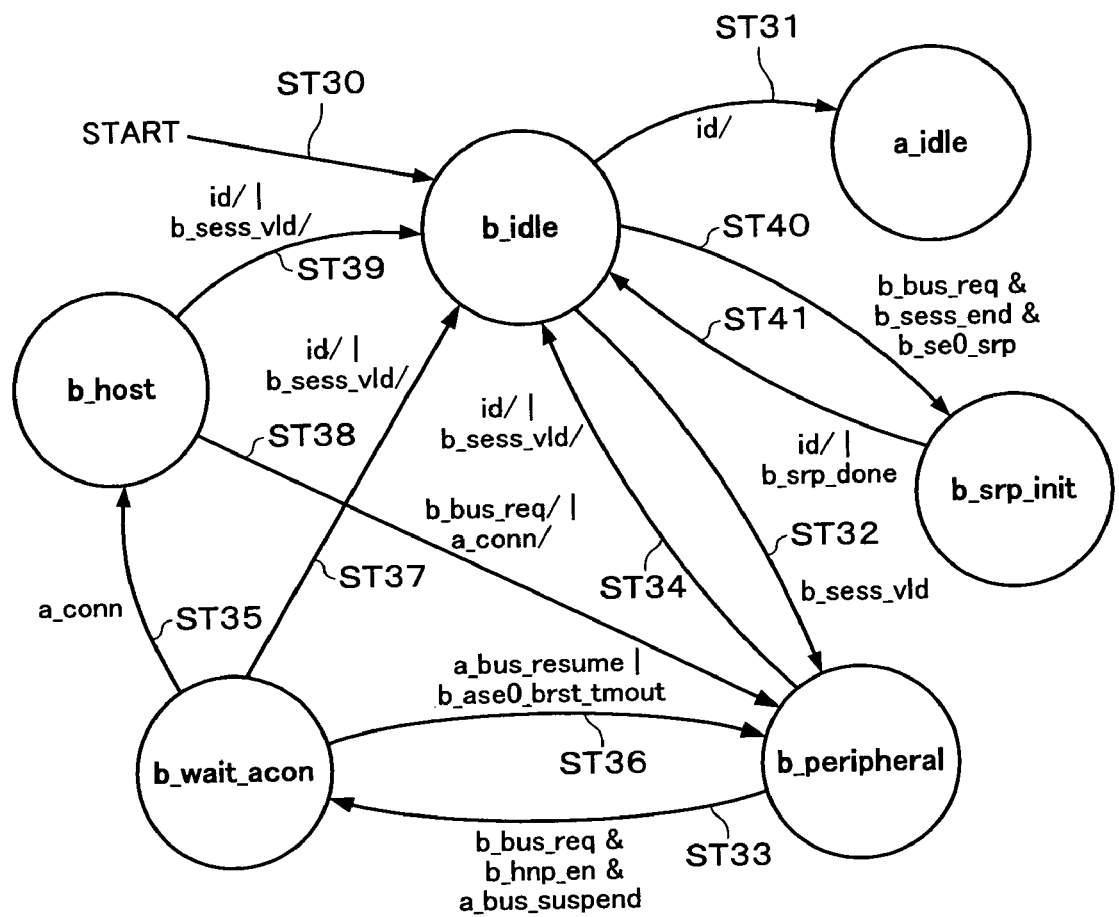
FIG. 6 is a diagram for illustrating state transition of a B-device.

FIG. 6 is a diagram for illustrating state transition of the B-device.

The b_idle state is the start state for the B-device (ST30).

In the b_idle state, supply of current to VBUS is suspended. Therefore, the voltage of VBUS is below the given threshold voltage. The pull-up of the data signal line D+ is turned off. If a Mini-A plug is inserted, since the ID terminal is at the "L" level (id/), the B-device transitions to the a_idle state (ST31). If the voltage of VBUS rises above the given threshold voltage (b_sess_vld), the B-device transitions to the b_peripheral state (ST32).

In the b_peripheral state, since the pull-up of the data signal line D+ is turned on, b_conn can be detected in the a_wait_bcon state of the A-device. In the b_peripheral state, the B-device operates as the peripheral in response to a request from the A-device. If the B-device detects that the A-device is in the a_suspend state (a_bus_suspend), the host application of the B-device requests the host operation (b_bus_req), and HNP is enabled by the A-device (b_hnp_en), the B-device transitions to the b_wait_acon state (ST33). In the b_peripheral state, if a Mini-A plug is inserted (id/), or if the voltage of VBUS drops below the given threshold voltage (b_sess_vld/), the B-device transitions to the b_idle state (ST34). The pull-up is turned off in the b_idle state, whereby the A-device transitions from the a_wait_vfall state to the a_idle state, for example.

In the b_wait_acon state, the B-device turns off the pull-up of the data signal line D+ and waits for the A-device to pull up the data signal line D+. If the pull-up of the data signal line D+ is turned on in the A-device (a_conn), the B-device transitions to the b_host state (ST35). In the b_wait_acon state, if the B-device detects that the A-device puts the line state in the "K" state (a_bus_resume), or if a predetermined period of time has elapsed in the b_wait_acon state (b_ase0_brst_tmout), the B-device transitions to the b_peripheral state (ST36). If a Mini-A plug is inserted (id/), or if the voltage of VBUS is below the given threshold voltage (b_sess_vld/), the B-device transitions to the b_idle state (ST37).

The host processing is performed in the b_host state. Specifically, the B-device resets the bus and starts issuing SOF packets. The A-device responds to a request from the B-device which operates as the host. If the B-device completes data transfer as the host and finishes using the bus (b_bus_req/), or if the B-device detects that the pull-up is turned off in the A-device (a_conn/), the B-device transitions to the b_peripheral state (ST38). The A-device detects the b_peripheral state as the b_bus_suspend of the B-device, whereby the A-device transitions from the a_peripheral state to the a_wait_bcon state. As a result, the pull-up of the A-device is turned off. In the b_peripheral state, the pull-up of the B-device is turned on. In the b_host state, if a Mini-A plug is inserted (id/), or if the voltage of VBUS is below the given threshold voltage (b_sess_vld/), the B-device transitions to the b_idle state (ST39).

The B-device requests start of a session by SRP when the A-device is in the suspend state. Specifically, if the host application of the B-device requests use of the bus (b_bus_req), the voltage of VBUS is below a session end threshold voltage of the B-device (b_sess_end), and a predetermined period of time has elapsed in a state in which the line state is in the "SE0" state (b_se0_srp), the B-device transitions to the b_srp_init state (ST40).

In the b_srp_init state, the B-device requests the A-device to start a session by SRP. If the B-device completes SRP (b_srp_done), or if a Mini-A plug is inserted (id/), the B-device transitions to the b_idle state (ST41).

2. Data Transfer Control Device

An OTG device controller IC (data transfer control device in a broad sense) which controls USB data transfer by switching between the host function and the peripheral function by the above-described state transition is described below.

Figure 7:
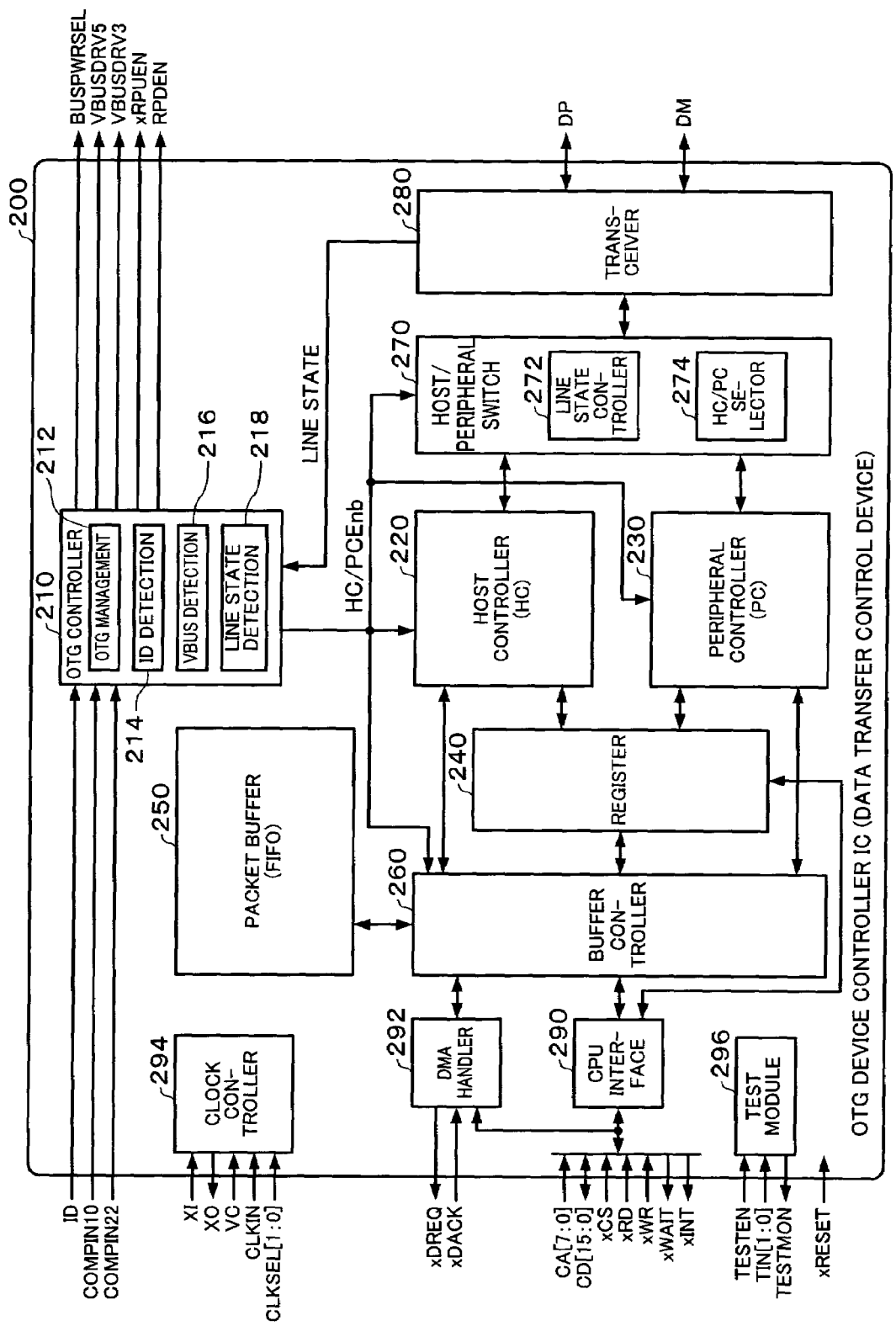
FIG. 7 is a functional block diagram of an OTG device controller IC.

FIG. 7 is a functional block diagram showing an OTG device controller IC.

An OTG device controller IC 200 includes an OTG controller (state controller in a broad sense) 210, an HC 220, a PC 230, a register section 240, a packet buffer 250, a buffer controller 260, a host/peripheral switch circuit 270, a transceiver 280, a CPU interface (IF) 290, a DMA handler 292, a clock controller (clock control circuit in a broad sense) 294, and a test module 296.

The OTG controller 210 generates a control signal corresponding to each state by state transition shown in FIGS. 5 and 6 while monitoring the states of the data lines and VBUS, and controls the data lines by controlling switching between the host and the peripheral, for example.

The OTG controller 210 includes an OTG management circuit 212, an ID detection circuit 214, a VBUS detection circuit 216, and a line state detection circuit 218. The OTG management circuit 212 manages an OTG state (each state shown in FIGS. 5 and 6) for functioning as a dual-role device. In more detail, the OTG management circuit 212 generates a control signal corresponding to the OTG state set by a CPU based on an OTG state command corresponding to the OTG state set by the CPU. The ID detection circuit 214 detects the state of the ID terminal as shown in FIG. 2. The VBUS detection circuit 216 detects whether or not the state of VBUS satisfies the detection condition corresponding to the OTG state. The line state detection circuit 218 detects whether or not the line state from the transceiver 280 satisfies the detection condition corresponding to the OTG state.

An ID signal is a signal connected to the ID terminal. The ID detection circuit 214 judges either an A-device or a B-device by the ID signal.

A 1.0 V level detection signal COMPIN1O is a detection signal which indicates whether or not the voltage of VBUS/2 is 1.0 V or more. A 2.2 V level detection signal COMPIN22 is a detection signal which indicates whether or not the voltage of VBUS/2 is 2.2 V or more. The VBUS detection circuit 216 detects whether or not the state of VBUS satisfies the detection condition in a given state by referring to the 1.0 V level detection signal COMPIN10 or the 2.2 V level detection signal COMPIN22.

A VBUS drive signal BUSPWRSEL is an enable signal for switching current to be supplied to VBUS to either 8 mA or 500 mA when using a 5 V power supply. A VBUS drive signal VBUSDRV5 is an enable signal for supplying current to VBUS with a 5 V power supply. A VBUS drive signal VBUSDRV3 is an enable signal for supplying current to VBUS with a 3.3 V power supply. An Rpu enable signal xRPUEN is a pull-up enable signal of the data signal line D+. An Rpd enable signal RPDEN is a pull-down enable signal of the data signal line D+.

The OTG management circuit 212 generates control signals (VBUS drive signals BUSPWRSEL, VBUSDRV5, and VBUSDRV3, Rpu enable signal xRPUEN, Rpd enable signal RPDEN, HC enable signal HCEnb, PC enable signal PCEnb, etc.) corresponding to the OTG state.

The HC 220 controls the operation of the host function when enabled by the HC enable signal HCEnb from the OTG controller 210. The state control of the HC 220 may be performed by the CPU (firmware). In more detail, the firmware may instruct the HC to generate the USB data line state ("J", "K", or "SE0") in each state by performing state transition of the host using various events (event which indicates transition to the OTG state a_host, for example) as a trigger, and setting an HC state command (Suspend, Reset, Operational, or Resume) corresponding to a destination state of the host in a given control register. The HC 220 generates a data line state corresponding to the state command set in the given control register. In the case where a time limit (time-out condition) is set in the state, state transition may be controlled by allowing the firmware to measure time. The HC 220 enabled in the A-device performs state transition of the host according to a flowchart shown in FIG. 8. USB transfer is performed in the "Operational" state. The HC 220 enabled in the B-device performs state transition of the host according to a flowchart shown in FIG. 9.

The PC 230 controls the operation of the peripheral function when enabled by the PC enable signal PCEnb from the OTG controller 210. The PC 230 detects Reset, Suspend, or Resume in the case of a peripheral in OTG state transition based on the line state detected by the OTG controller 210 and the like, and notifies the CPU of the detected results by an interrupt. Remote wakeup detection is enabled in the case of a host in OTG state transition. The HC 220 and the PC 230 are enabled exclusively.

The register section 240 is a group of registers for controlling the operations as the host and the peripheral.

The packet buffer 250 is a buffer which stores packets transferred as the host or the peripheral.

The buffer controller 260 manages an access address to the packet buffer 250 which is input or output through the CPU I/F 290 or the DMA handler 292, and manages the access address to the packet buffer 250 which is input or output when performing USB transfer.

The host/peripheral switch circuit 270 includes a line state controller 272 and an HC/PC selector 274. The line state controller 272 instructs the transceiver 280 to generate the signal line state. The HC/PC selector 274 switches a path for connecting the transceiver 280 with either the HC 220 or the PC 230.

The transceiver 280 transmits or receives the USB data signal, generates the USB data line state, and performs parallel/serial conversion, bit stuffing/unstuffing, and the like. The USB positive signal DP is output to the data signal line D+. The USB negative signal DM is output to the data signal line D−.

The CPU I/F 290 controls PIO transfer and generates an interrupt signal to the CPU. CPU address CA[7:0] is a CPU address bus. CPU data CD[15:0] is a CPU data bus and is also used as a DMA data bus. A chip select xCS is a chip select signal. A read strobe xRD is a CPU read strobe and is used in common as a DMA read strobe. A write strobe xWR is a CPU write strobe and is used in common as a DMA write strobe. A wait signal xWAIT is a wait signal to the CPU. An interrupt signal xINT is an interrupt signal to the CPU.

The DMA handler 292 controls DMA transfer. A DMA request xDREQ is a DMA transfer request signal. A DMA acknowledge xDACK is a DMA transfer enable signal.

The clock controller (clock control circuit) 294 distributes and controls clock signals supplied to each of the above-described functional blocks. The clock controller 294 generates a clock signal by multiplying an oscillation output using an oscillator connected with an oscillator input XI and an oscillator output XO by means of a PLL circuit. The clock controller 294 may have a configuration in which a PLL filter circuit is connected with the PLL filter VC, or may be able to select either a clock signal from an external clock input CLKIN or a clock signal using the oscillator by a clock select signal CLKSEL [1:0].

A test module 296 is a module for performing an operability test of each section of the OTG device controller IC 200. The test module 296 performs a test in a test mode selected by a test mode TIN [1:0] when enabled by a test enable TEST, and monitors an internal test through a test monitor TESTMON.

In the OTG device controller IC 200 having such a configuration, the CPU is notified of the transition condition detected by the OTG controller 210 as an interrupt signal through the CPU I/F 290, and the CPU (firmware) is allowed to control state transition. The CPU sets an OTG state command corresponding to a destination OTG state in the OTG controller 210 through the CPU interface 290. The OTG controller 210 generates a control signal corresponding to the OTG state command set therein and controls each functional block. Specifically, transition between each state is controlled by the firmware. The H/W interrupt signal or instructions from the host application (software) is the state transition condition.

Figure 8:
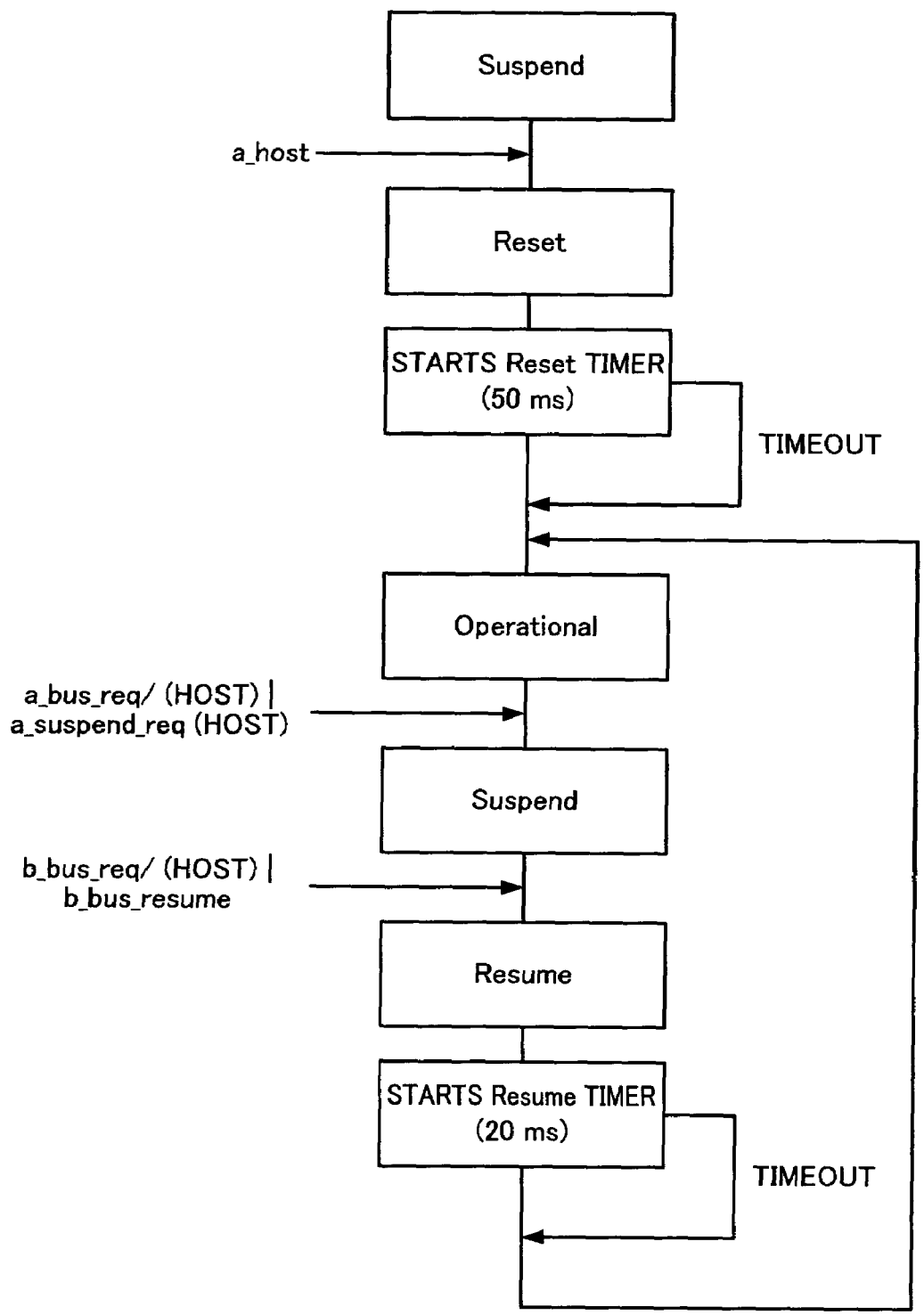
FIG. 8 is a flowchart showing an example of state transition performed by an HC when an OTG device controller IC is an A-device.
Figure 9:
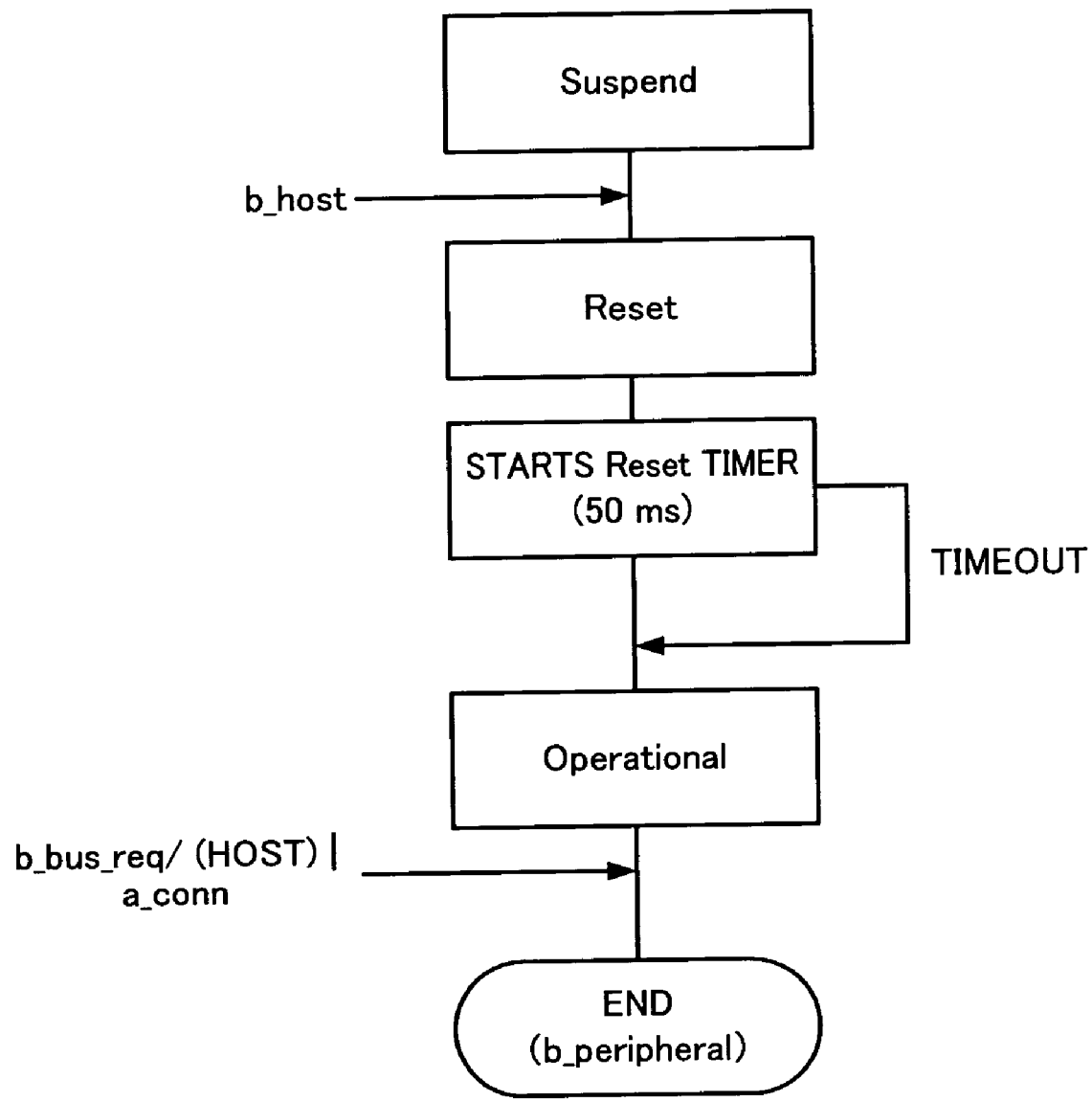
FIG. 9 is a flowchart showing an example of state transition performed by an HC when an OTG device controller IC is a B-device.

The HC 220 may control transition between each state for performing the host function in the same manner as described above. In more detail, as shown in FIGS. 8 and 9, state transition of the HC state is controlled by the firmware, and the HC 220 in which the HC state command corresponding to the destination HC state is set controls the host by a control signal corresponding to the HC state command.

Figure 10:
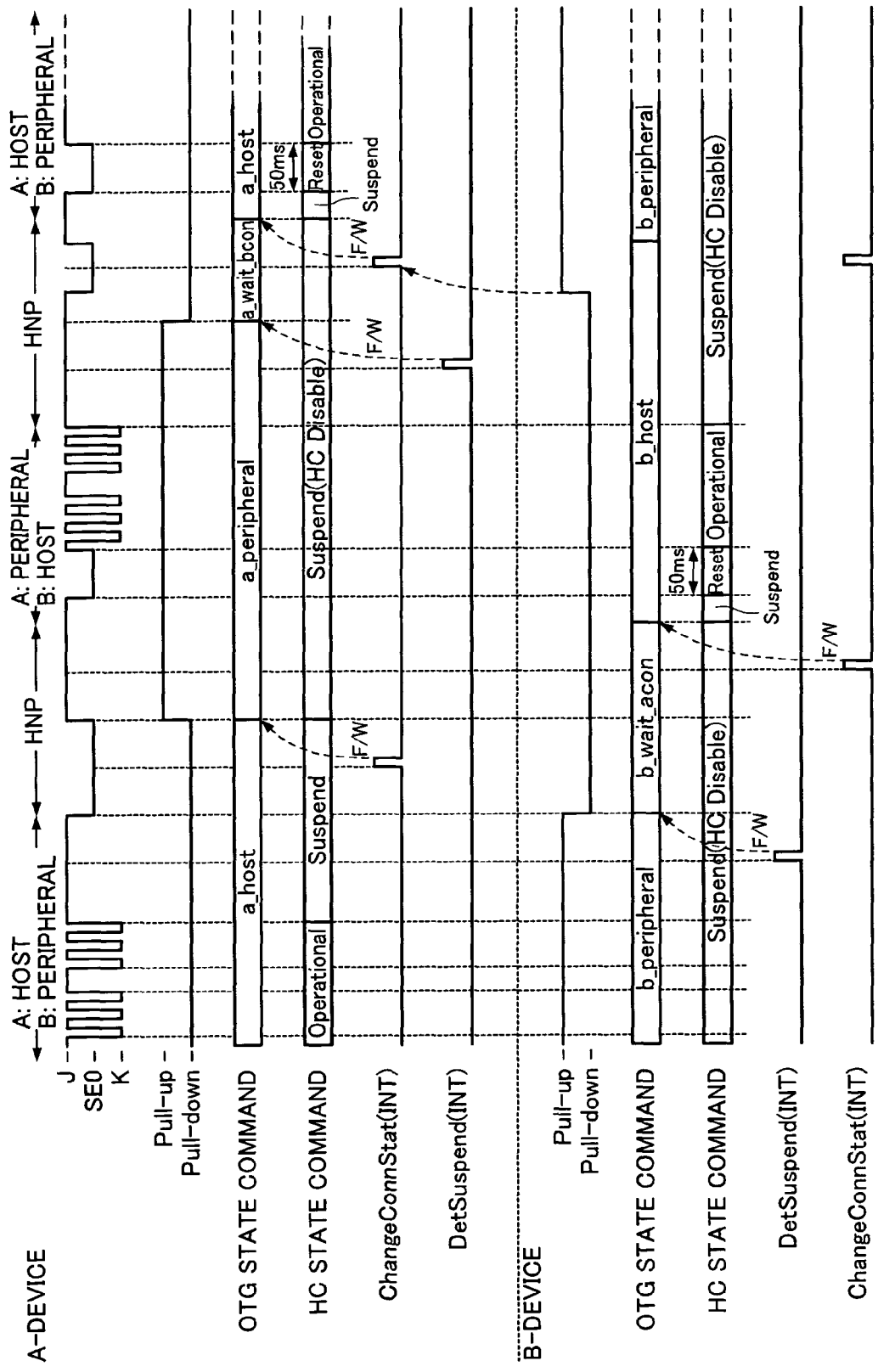
FIG. 10 is a timing chart showing an example of HNP operation timing by an OTG device controller IC.

This enables the operation as the dual-role device to be realized while exchanging the host function and the peripheral function by HNP, as shown in FIG. 10. In FIG. 10, the firmware controls the operation of the dual-role device by issuing the OTG state command and the HC state command by an interrupt signal.

3. Clock Controller (Clock Control Circuit)

The OTG device controller IC 200 switches between the host function and the peripheral function by transitioning between a plurality of states shown in FIGS. 5 and 6 when realizing the function as the dual-role device. However, since the OTG device controller IC 200 exclusively switches between these functions, power consumption is unnecessarily increased if clocks are steadily supplied to each functional block shown in FIG. 7. Therefore, the clock controller 294 is capable of generating clocks which can be controlled so that the output of the clocks can be suspended or the frequency of the clocks can be reduced corresponding to state transition for each circuit block in a unit of functional blocks of the OTG device controller IC 200 to which the clock can be supplied in common.

If the clock supply is controlled while distinguishing functional blocks to be used in the state after transition from functional blocks not to be used in the state after transition, processing becomes complicated. Moreover, since clock supply control timing differs between each state, it is difficult to control the clock supply by using hardware in the case of controlling the clock supply after a predetermined procedure in the state after transition. Therefore, in the clock controller 294, a clock control pattern which indicates whether or not to supply clocks for every circuit block is set by the firmware, and output of the clocks is controlled for every circuit block by decoding the clock control pattern. This enables unnecessary power consumption to be prevented by simplified clock supply control in the case where the device is controlled by a number of state transitions and the functional blocks may not be used depending on each state.

3.1 Outline of Configuration

Figure 11:
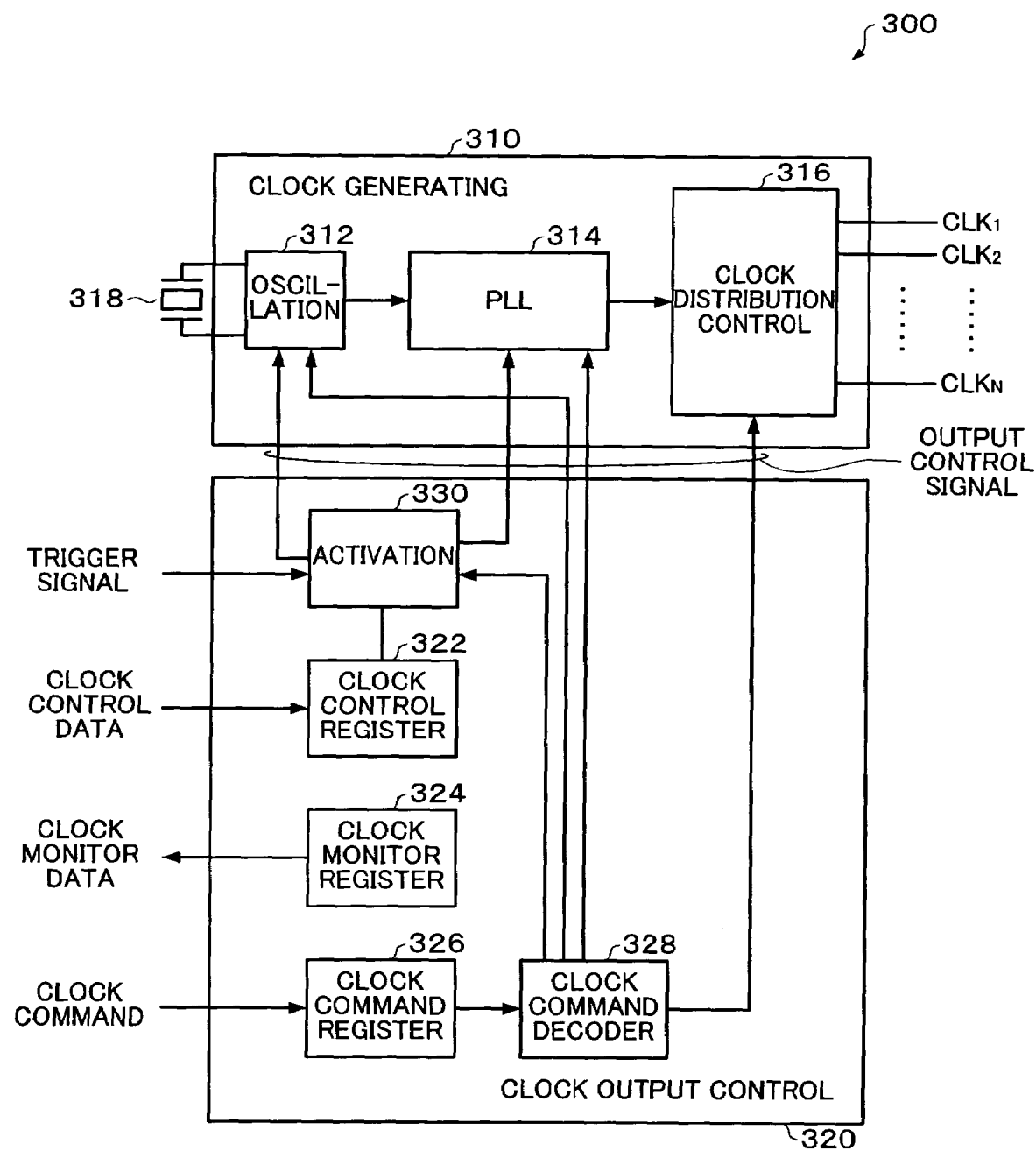
FIG. 11 is a block diagram showing an outline of the configuration of a clock control circuit.

FIG. 11 shows an outline of a configuration of a clock control circuit which is applied to the clock controller 294.

A clock control circuit 300 includes a clock generating circuit 310 and a clock output control circuit 320.

The clock generating circuit 310 includes an oscillation circuit 312, a PLL circuit 314, and a clock distribution control circuit 316. The oscillation circuit 312 supplies oscillation output corresponding to an oscillation frequency of an externally connected oscillator 318 to the PLL circuit 314. The PLL circuit 314 generates a PLL clock by multiplying the oscillation output. The clock distribution control circuit 316 generates a plurality of clocks ($CLK_1$, $CLK_2$, ..., and $CLK_N$) to be supplied to each circuit block by using the PLL clock, and distributes the clocks to each circuit block.

The oscillation circuit 312 starts or suspends the oscillation operation by an oscillation enable signal OSCen (output control signal in a broad sense).

The PLL circuit 314 starts or suspends the PLL oscillation operation or suspends output of the PLL clock by a PLL enable signal PLLen (output control signals in a broad sense).

The clock distribution control circuit 316 controls clocks output to each circuit block by clock distribution control signals (output control signal in a broad sense) from the clock output control circuit 320, and supplies the clocks to the circuit blocks.

The clock output control circuit 320 may include a clock control register 322, a clock monitor register 324, a clock command register 326, a clock command decoder 328, and an activation circuit 330.

Clock control data is set in the clock control register 322 by the firmware. As an example of the clock control data, the number of waits until the oscillation circuit or the PLL circuit is allowed to become stable can be given.

Monitoring results for the clock generating circuit 310 by the clock output control circuit 320 are set in the clock monitor register 324. As the monitoring results, the state of the oscillation enable signal OSCen output from the activation circuit 330, or the state of the output control signal output from the clock command decoder 328 may be set, for example. The CPU which processes the firmware may refer to clock monitor data read from the clock monitor register 324, for example.

A clock command is set in the clock command register 326 by the firmware or hardware. The clock command is a clock control pattern which indicates whether or not to control output of the clocks ($CLK_1$, to $CLK_N$) in a unit of the circuit blocks.

The clock command decoder 328 decodes the clock control pattern set in the clock command register 326, and generates output control signals. The output of the oscillation circuit 312, the PLL circuit 314, or the clock distribution control circuit 316 can be controlled by the output control signals.

When a trigger signal is input to the activation circuit 330, the activation circuit 330 outputs the oscillation enable signal OSCen which allows the oscillation circuit 312 to start the oscillation operation, and the PLL enable signal PLLen. The activation circuit 330 controls oscillation or PLL oscillation by using the results decoded by the clock command decoder 328. The activation circuit 330 may control oscillation or PLL oscillation based on the contents set in the clock control register 322.

The activation circuit 330 may include an oscillation circuit wakeup circuit and a PLL circuit wakeup circuit, for example. In this case, the activation circuit 330 allows the oscillation circuit 312 to start the oscillation operation when the trigger signal is input to the activation circuit 330, and allows the oscillation circuit wakeup circuit to count a period of time until the oscillation operation of the oscillation circuit 312 becomes stable. The oscillation circuit wakeup circuit informs the PLL circuit connected to the subsequent stage of the oscillation circuit 312 that the oscillation clock is stable when timed out. The activation circuit 330 then allows the PLL circuit to start the oscillation operation, and allows the PLL circuit wakeup circuit to count a period of time until the oscillation operation of the PLL circuit 314 becomes stable. The PLL circuit wakeup circuit enables output of the PLL circuit 314 when timed out, whereby a stable PLL clock can be output.

Starting and suspending oscillation can be controlled by controlling whether or not to fix given oscillation nodes in the oscillation circuit 312 and the PLL circuit 314. Starting and suspending output of the PLL circuit 314 can be controlled by controlling whether or not to fix the output of the PLL circuit 314 at an "L" level.

The OTG device controller IC 200 is set to either a self-powered A-device (first device in a broad sense) or a B-device which can operate with power on the bus (second device in a broad sense) when connected with a USB cable. The OTG device controller IC 200 set to either the A-device or the B-device controls switching between the host (host which has the initiative for data transfer control) function and the peripheral (peripheral which does not have the initiative for data transfer control) function. Therefore, it is important to control the clocks supplied to each section of the OTG device controller IC 200 corresponding to complicated state transition. The clock supply control of the OTG device controller IC 200 is described below in detail.

3.2 Circuit Block

Figure 12:
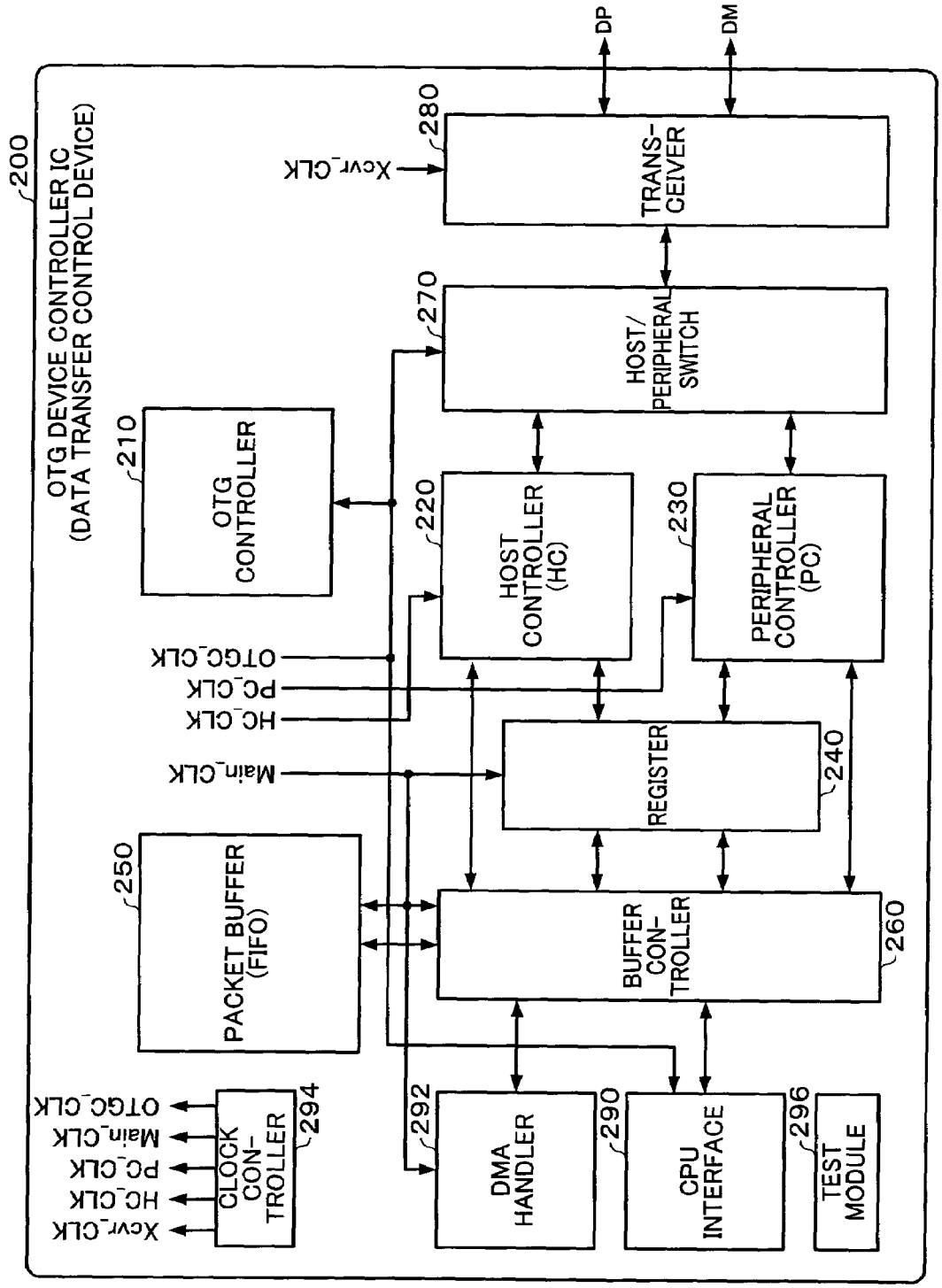
FIG. 12 is a diagram for illustrating a clock supplied for every circuit block.

FIG. 12 is a diagram for illustrating an example of the circuit blocks which are used as a unit for output control of the clock controller 294 to which the clock control circuit 300 is applied.

In FIG. 12, sections the same as the functional blocks of the OTG device controller IC 200 shown in FIG. 7 are indicated by the same symbols.

In the present embodiment, the OTG device controller IC 200 is divided into five circuit blocks, for example, and generation and output of clocks are controlled for every circuit block. In more detail, the clock controller 294 generates a transceiver clock Xcvr_CLK, an HC clock HC_CLK, a PC clock PC_CLK, a main clock Main_CLK, and an OTGC clock OTGC_CLK. The transceiver clock Xcvr_CLK is supplied to the transceiver 280. The HC clock HC_CLK is supplied to the HC 220. The PC clock PC_CLK is supplied to the PC 230. The main clock Main_CLK is supplied to the register section 240, the packet buffer 250, the buffer controller 260, and the DMA handler 292. The OTG clock OTGC_CLK is supplied to the OTG controller 210, the host/peripheral switch circuit 270, and the CPU interface 290.

3.3 Clock Control Pattern

FIG. 13 shows an example of the clock control pattern.

The clock control pattern indicates whether or not to control output for every circuit block corresponding to the OTG state shown in FIGS. 5 and 6.

In the OTG device controller IC 200, state transition is controlled by the firmware. A state command corresponding to a destination state is set in the OTG controller 210, and a control signal which controls the destination state is generated by decoding the state command. Therefore, since the state command is set in the OTG device controller IC 200 by the firmware in principle, a clock must be supplied to the OTG controller 210 which generates a control signal corresponding to the state and the CPU interface 290 for setting a state command corresponding to the state. Therefore, the OTGC clock OTGC_CLK is supplied in almost all the states.

In the a_idle state of the A-device, current is not supplied to VBUS and the data signal lines D+ and D− are not driven. However, since the A-device must detect SRP from the B-device which is the connection partner, it is necessary to supply a clock to the OTG controller 210 and the CPU interface 290. Therefore, only the OTGC clock OTGC_CLK is supplied in the a_idle state.

The a_wait_vrise state is a state which waits for the voltage of VBUS to reach a given threshold voltage. The a_wait_bcon state is a state which waits for the data signal line to be pulled up in the B-device. Therefore, it is necessary to supply a clock to the OTG controller 210 and the CPU interface 290 in these states.

In the a_host state, the host operation is performed by the HC 220. Therefore, it is unnecessary to supply a clock to the PC 230 which controls the operation of the peripheral function which is exclusively switched to or from the host function. Therefore, power consumption can be reduced by suspending supply of only the PC clock PC_CLK in the a_host state.

In the a_suspend state, the B-device can initiate SRP or HNP. Therefore, it is necessary to supply a clock to the OTG controller 210 and the CPU interface 290.

In the a_peripheral state, the peripheral operation is performed by the PC 230. Therefore, it is unnecessary to supply a clock to the HC 220 which controls the operation of the host function which is exclusively switched to or from the peripheral function. Therefore, power consumption can be reduced by suspending supply of only the HC clock HC_CLK in the a_peripheral state.

The a_wait_vfall state is a state which waits for the voltage of VBUS to drop below the given threshold voltage. Therefore, it is necessary to supply a clock to the OTG controller 210 and the CPU interface 290.

The a_vbus_err state is a state which waits for the voltage of VBUS to drop due to overcurrent. Therefore, it is necessary to supply a clock to the OTG controller 210 and the CPU interface 290.

When set to the B-device, the b_idle state is a default state when the USB cable is not connected. Therefore, supply of clocks to each section of the OTG device controller IC 200 is suspended in order to prevent current from being consumed without controlling data transfer. When transitioning from the b_idle state to another state, the oscillation circuit and the PLL circuit are allowed to start the operations using an interrupt corresponding to the transition condition (ChangeID interrupt or Cross44V interrupt as described later, for example) as a trigger. After a clock is steadily supplied to the OTG controller 210 and CPU interface 290 and a state command can be set in the OTG controller 210, a state command corresponding to the destination state is set in the OTG controller 210.

The b_srp_init state is a state in which the B-device initiates SRP. In the b_srp_init state, it is necessary to supply a clock to the OTG controller 210 and the CPU interface 290 in order to enable data line pulsing or VBUS pulsing by SRP.

In the b_peripheral state, the peripheral operation is performed by the PC 230. Therefore, it is unnecessary to supply a clock to the HC 220 which controls the operation of the host function which is exclusively switched to or from the peripheral function. Therefore, power consumption can be reduced by suspending supply of only the HC clock HC_CLK in the b_peripheral state.

According to the USB 2.0 standard, if the B-device as the downstream device detects that the A-device as the upstream device, which is the connection partner, puts the bus in the suspend state for 3 ms or more in the b_periheral state, the A-device transitions to the suspend state of the USB host. In this case, since the A-device which operates as the host is in the USB suspend state, the B-device cannot perform the operation. Therefore, power consumption can be reduced by suspending supply of clocks to all the blocks.

The b_wait_acon state is a state which waits for the A-device to become a peripheral by HNP. Therefore, it suffices to supply a clock only to the OTG controller 210 and the CPU interface 290. However, the b_wait_acon state is generally in the middle of transition from the b_periheral state to the b_host state. If a period of time of the b_wait_acon state is short, clock supply control is simplified by controlling clock supply in the same manner as in the b_peripheral state. Therefore, the clock control pattern in the b_wait_acon state is the same as the clock control pattern in the b_peripheral state in FIG. 13.

In the b_host state, the host operation is performed by the HC 220. However, it is unnecessary to supply a clock to the PC 230 which controls the operation of the peripheral function which is exclusively switched to or from the host function. Therefore, power consumption can be reduced by suspending supply of only the PC clock PC_CLK in the b_host state.

In the test mode, clocks are supplied to all the functional blocks in order to perform a given test for all the functional blocks.

As described above, in the case of controlling the clocks for every circuit block in each state of the A-device and the B-device, the clock control patterns consist of the Wait mode, the Host mode, the Peripheral mode, the AllSleep mode, and the AllActive mode (five patterns).

In the Wait mode, a clock (OTGC clock OTGC_CLK) is supplied to the OTG controller 210, the CPU interface 290, and the host/peripheral switch circuit 270.

In the Host mode, clocks (OTGC clock OTGC_CLK and HC clock HC_CLK) are supplied to the OTG controller 210, the CPU interface 290, the host/peripheral switch circuit 270, and the HC 220.

In the Peripheral mode, clocks (OTGC clock OTGC_CLK and PC clock PC_CLK) are supplied to the OTG controller 210, the CPU interface 290, the host/peripheral switch circuit 270, and the PC 230.

In the AllSleep mode, not only all the functional blocks but also the oscillation operations of the oscillation circuit and the PLL circuit are suspended.

In the AllActive mode, clocks are supplied to all the functional blocks.

One of these five patterns is set in the clock control circuit 300 by the firmware as the clock control pattern. The clock control circuit 300 decodes the clock control pattern and controls clock output for every circuit block.

3.4 Detailed Configuration Example

Figure 14:
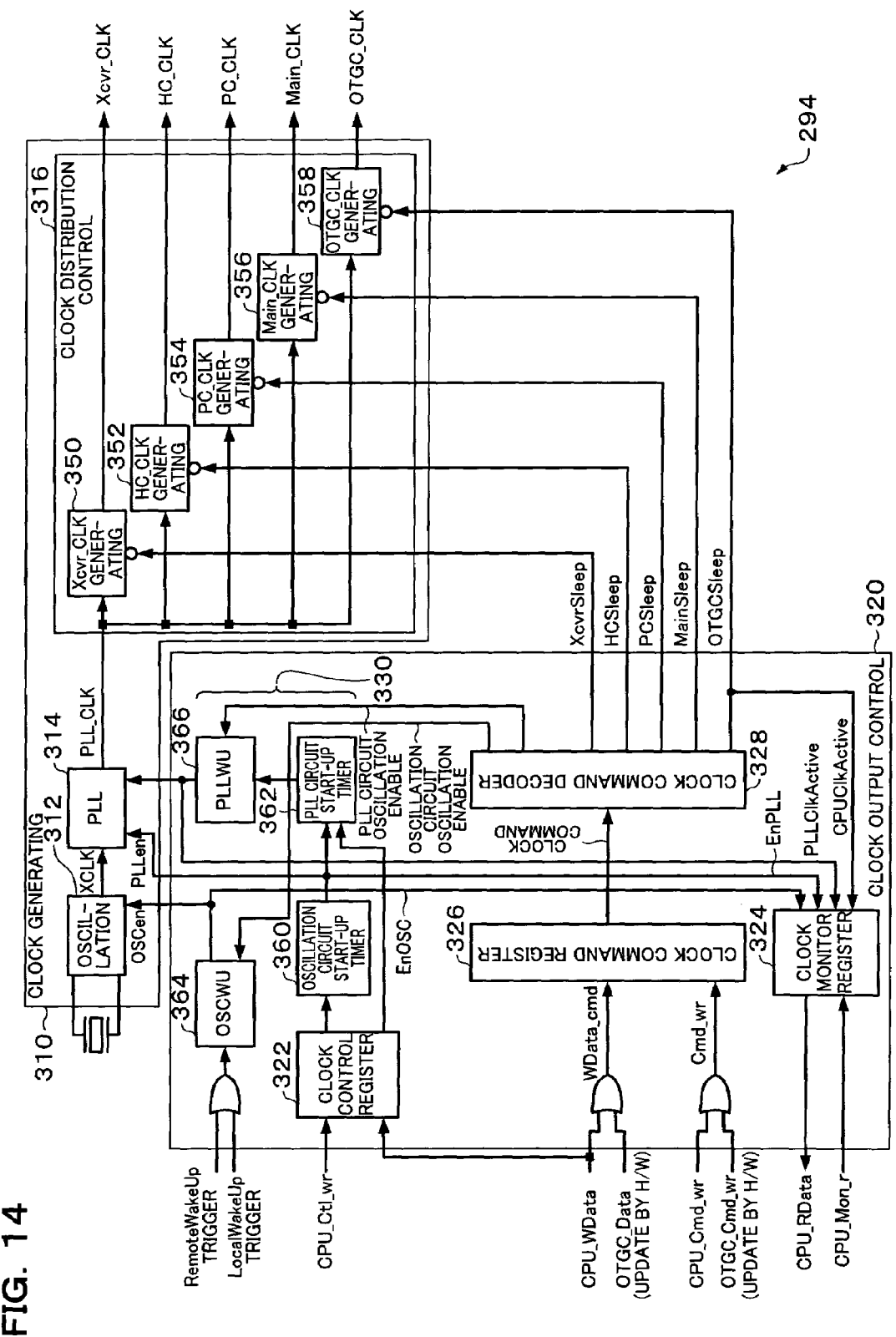
FIG. 14 is a circuit diagram showing a detailed example of a clock controller.

FIG. 14 shows a detailed configuration example of the clock controller 294.

In FIG. 14, sections the same as the sections of the clock control circuit 300 shown in FIG. 11 are indicated by the same symbols. Description of these sections is appropriately omitted.

The clock generating circuit 310 includes the oscillation circuit 312, the PLL circuit 314, and the clock distribution control circuit 316.

In the clock generating circuit 310, an oscillation clock XCLK is output from the oscillation circuit 312, and a PLL clock PLL_CLK is generated by the PLL circuit 314 by multiplying the oscillation clock XCLK. The PLL clock PLL_CLK is supplied to the clock distribution control circuit 316.

The clock distribution control circuit 316 generates clocks (transceiver Xcvr_CLK, HC clock HC_CLK, PC clock PC_CLK, main clock Main_CLK, and OTGC clock OTGC_CLK in FIG. 14) for every circuit block by using the PLL clock PLL_CLK. The clock distribution control circuit 316 includes an Xcvr_CLK generating circuit 350, an HC_CLK generating circuit 352, a PC_CLK generating circuit 354, a Main_CLK generating circuit 356, and an OTGC_CLK generating circuit 358. The Xcvr_CLK generating circuit 350 generates the transceiver clock Xcvr_CLK at a given frequency by using the PLL clock PLL_CLK, and suspends the transceiver clock Xcvr_CLK or reduces the frequency of the transceiver clock Xcvr_CLK based on an output control signal XcvrSleep from the clock command decoder 328. The HC_CLK generating circuit 352 generates the HC clock HC_CLK at a given frequency by using the PLL clock PLL_CLK, and controls output of the HC clock HC_CLK based on an output control signal HCSleep from the clock command decoder 328. The PC_CLK generating circuit 354 generates the PC clock PC_CLK at a given frequency by using the PLL clock PLL_CLK, and controls output of the PC clock PC_CLK based on an output control signal PCSleep from the clock command decoder 328. The Main_CLK generating circuit 356 generates the main clock Main_CLK at a given frequency by using the PLL clock PLL_CLK, and controls output of the main clock Main_CLK based on an output control signal MainSleep from the clock command decoder 328. The OTGC_CLK generating circuit 358 generates the OTGC clock OTGC_CLK at a given frequency by using the PLL clock PLL_CLK, and controls output of the OTGC clock OTGC_CLK based on an output control signal OTGCSleep from the clock command decoder 328.

The activation circuit 330 of the clock output control circuit 320 includes an oscillation circuit start-up timer 360, a PLL circuit start-up timer 362, an oscillation circuit wakeup (OSCWakeUp) circuit 364, and a PLL circuit wakeup (PLLWakeUp) circuit 366.

The oscillation circuit start-up timer 360 outputs a PLL circuit activation signal when a period for the number of waits set in the clock control register 322 as an oscillation output stable period has elapsed after the timer is started. This allows the PLL circuit 314 to start PLL oscillation and the PLL circuit start-up timer 362 to start.

The PLL circuit start-up timer 362 outputs a PLL circuit wakeup signal to the PLL wakeup circuit 366 when a period for the number of waits set in the clock control register 322 as a PLL oscillation output stable period has elapsed after the timer is started.

An oscillation circuit oscillation enable signal which is output from the clock command decoder 328 is input to the oscillation circuit wakeup circuit 364. The oscillation circuit wakeup circuit 364 enabled by the oscillation circuit oscillation enable signal is activated by a resume trigger signal, and outputs the oscillation enable signal OSCen to the oscillation circuit 312. In more detail, the oscillation circuit wakeup circuit 364 enabled by the oscillation circuit oscillation enable signal is activated by a RemoteWakeUp trigger or a LocalWakeUp trigger, and outputs the oscillation enable signal OSCen to the oscillation circuit 312. The RemoteWakeUp trigger goes active when the A-device detects that the B-device puts the line state in the "K" state when the A-device transitions from the a_suspend state to the a_host state. The LocalWakeUp trigger goes active when the ChangeID interrupt, DetnonJ interrupt, or Cross44V interrupt occurs. The ChangeID interrupt occurs with the change of the ID terminal as a trigger, such as in the case where a Mini-A plug is inserted, when transitioning from the b_idle state to the a_idle state. The DetnonJ interrupt occurs when detecting that the line state is not in the "J" state when transitioning from the b_idle state to the b_peripheral state. The Cross44V interrupt occurs when the voltage of VBUS is changed across a given threshold voltage of 4.4 V in the A-device.

A PLL circuit oscillation enable signal output from the clock command decoder 328 is input to the PLL circuit wakeup circuit 366. The PLL circuit wakeup circuit 366 enabled by the PLL circuit oscillation enable signal is activated by the PLL circuit wakeup signal output from the PLL circuit start-up timer 362, and generates a PLL circuit output enable signal.

The number of waits of the oscillation circuit or the PLL circuit is set as CPU_WData in the clock control register 322 by the firmware based on a write enable signal CPU_Ctl_wr.

A clock command from the firmware or a clock command from the OTG controller 210 is set in the clock command register 326 based on a write enable signal CPU_Cmd_wr from the firmware or a write enable signal OTGC_Cmd_wr from the OTG controller 210. The write enable signal OTGC_Cmd_wr includes a trigger signal generated based on the monitoring results for the line state (RemoteWakeUp or LocalWakeUp, for example).

In the clock monitor register 324, the state of the oscillation enable signal OSCen output from the oscillation circuit wakeup circuit 364 is set in a bit field assigned as EnOSC. The state of the PLL enable signal PLLen output from the oscillation circuit start-up timer 360 is set in a bit field of the clock monitor register 324 assigned as EnPLL. The state of the PLL circuit output enable signal output from the PLL circuit wakeup circuit 366 is set in a bit field of the clock monitor register 324 assigned as PLLClkActive. The state of the clock distribution control signal OTGCSleep output from the clock command decoder 328 is set in a bit field of the clock monitor register 324 assigned as CPUClkActive. The contents of the clock command register 326 are read as CPU_RData based on a read enable signal CPU_Mon_r from the firmware.

The clock command decoder 328 decodes the clock command set in the clock command register 326 and generates the oscillation circuit oscillation enable signal, the PLL circuit oscillation enable signal, and the clock distribution control signals XcvrSleep, HCSleep, PCSleep, MainSleep, and OTGCSleep (output control signals in a broad sense). The clock distribution control signals are supplied to the Xcvr_CLK generating circuit 350, the HC_CLK generating circuit 352, the PC_CLK generating circuit 354, the Main_CLK generating circuit 356, and the OTGC_CLK generating circuit 358.

The operation of the clock controller 294 having such a configuration is described below.

FIGS. 15 to 20 show examples of operation timing of the clock controller 294.

Figure 15:
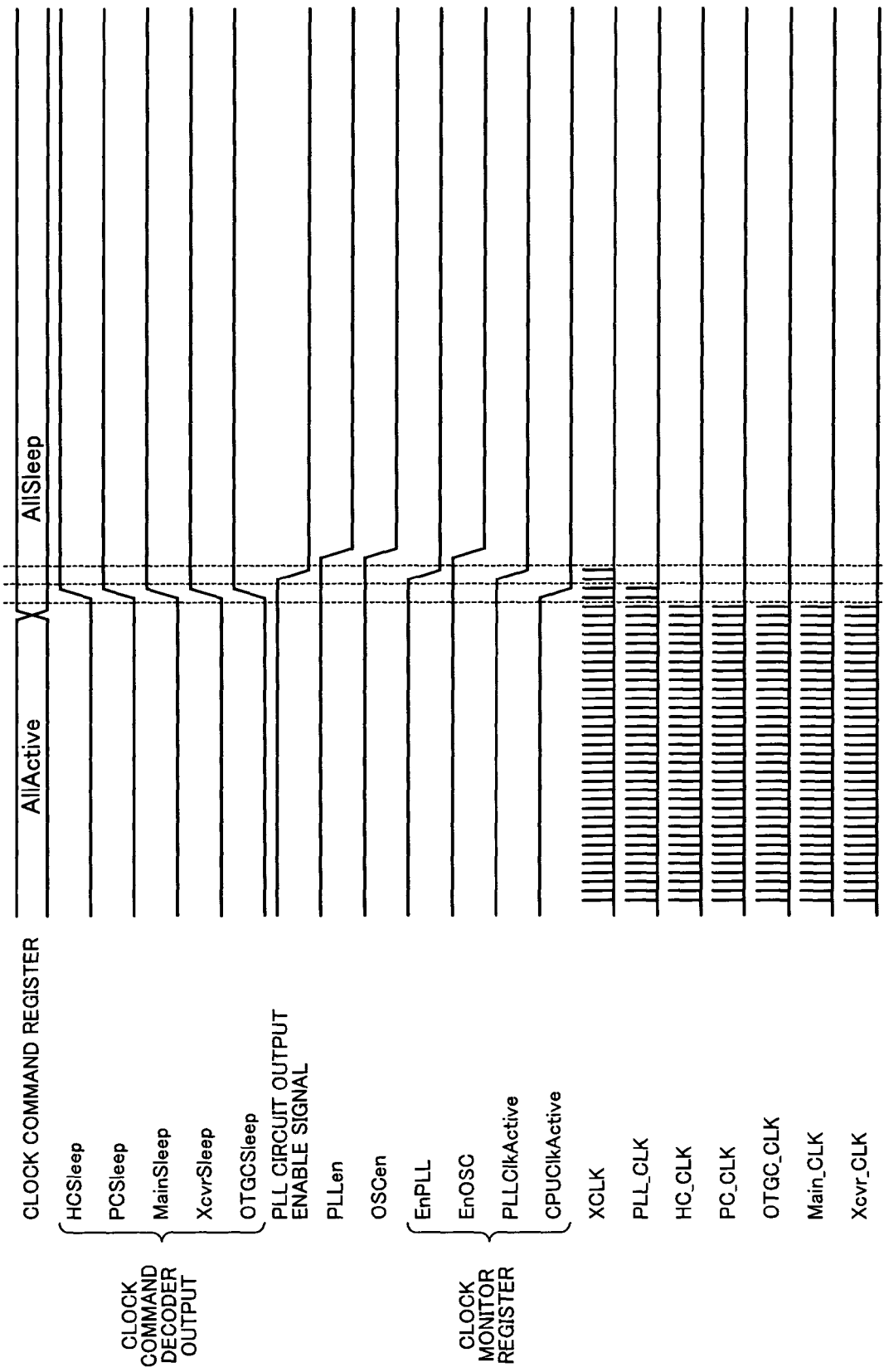
FIG. 15 is a timing chart showing an example of operation timing of clock supply control when transitioning from a default state after reset to an idle state of a B-device.

FIG. 15 shows an example of the clock supply control operation timing when transitioning from the default state after reset to the idle state of the B-device. When the clock controller 294 is reset, a clock command corresponding to the AllActive mode in which clocks are supplied to all the functional blocks for initializing the internal state is set in the clock command register 326. This allows the clock distribution control signals (output control signals in a broad sense) XcvrSleep, HCSleep, PCSleep, MainSleep, and OTGCSleep at an "L" level to be output. The oscillation circuit oscillation enable signal and the PLL circuit oscillation enable signal (output control signals in a broad sense) in an enable state are output. Therefore, the oscillation circuit and the PLL circuit perform the oscillation operations, whereby the PLL clock PLL_CLK is output. The transceiver clock Xcvr_CLK, the HC clock HC_CLK, the PC clock PC_CLK, the main clock Main_CLK, and the OTGC clock OTGC_CLK are then output from the clock distribution control circuit 316.

When entering the idle state of the B-device, the firmware sets a clock command corresponding to the AllSleep mode in the clock command register 326. This allows the clock distribution control signals (output control signals in a broad sense) XcvrSleep, HCSleep, PCSleep, MainSleep, and OTGCSleep at an "H" level to be output. Therefore, output of the transceiver clock Xcvr_CLK, the HC clock HC_CLK, the PC clock PC_CLK, the main clock Main_CLK, and the OTGC clock OTGC_CLK from the clock distribution control circuit 316 is suspended. Since the PLL circuit oscillation enable signal and the oscillation circuit oscillation enable signal (output control signals in a broad sense) are decoded to be in a disable state, the oscillation operations are suspended.

Figure 16:
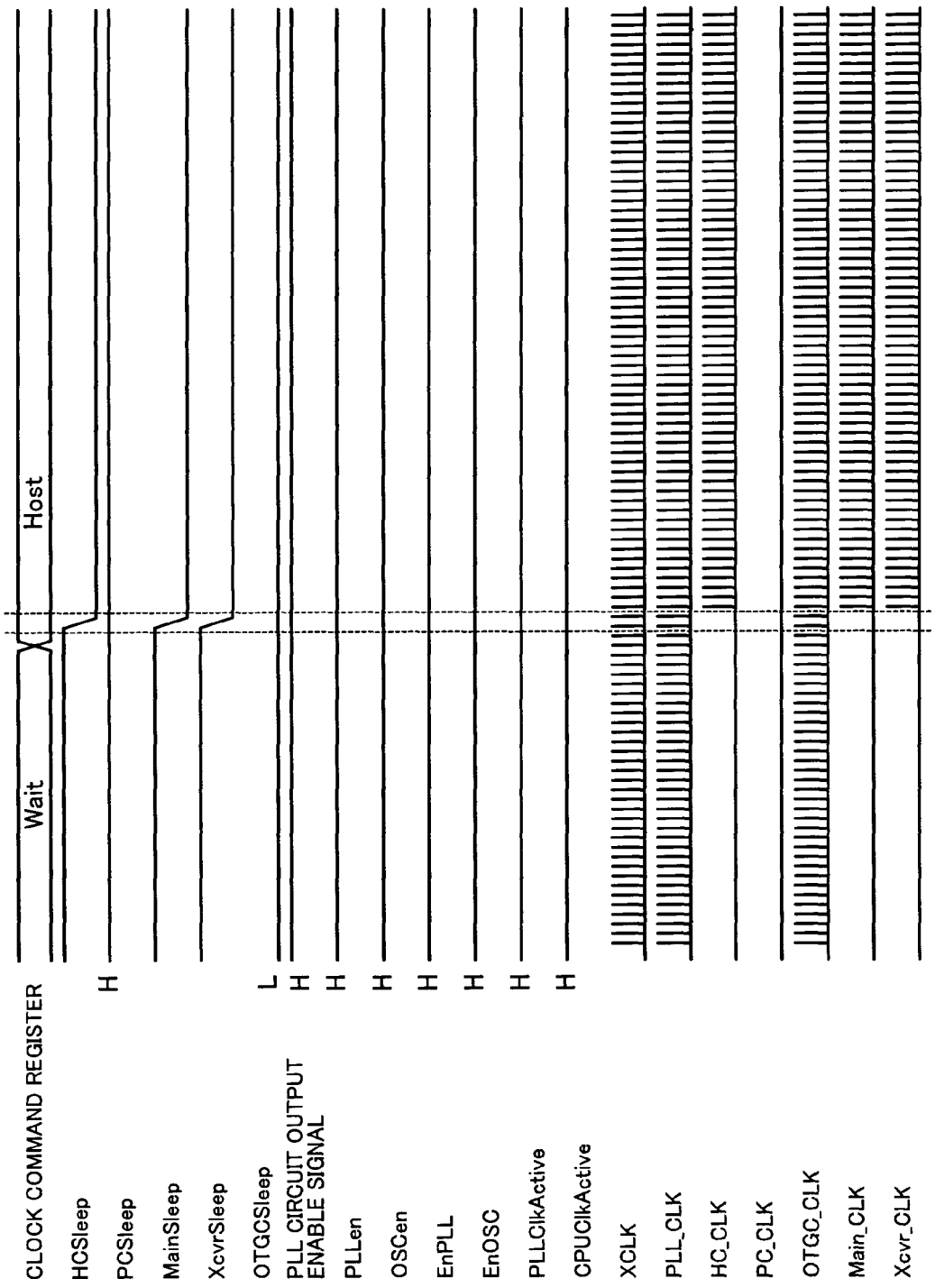
FIG. 16 is a timing chart showing an example of operation timing of clock supply control when an A-device transitions from a B-device detection wait state to a host state.

FIG. 16 shows an example of the clock supply control operation timing when the A-device transitions from the B-device detection wait state to the host state. When the A-device transitions from the a_wait_bcon state to the a_host state, a clock command corresponding to the Host mode is set in the clock command register in which the clock command corresponding to the Wait mode has been set by the firmware. This allows output of the HC clock HC_CLK, the transceiver clock Xcvr_CLK, and the main clock Main_CLK to be started.

Figure 17:
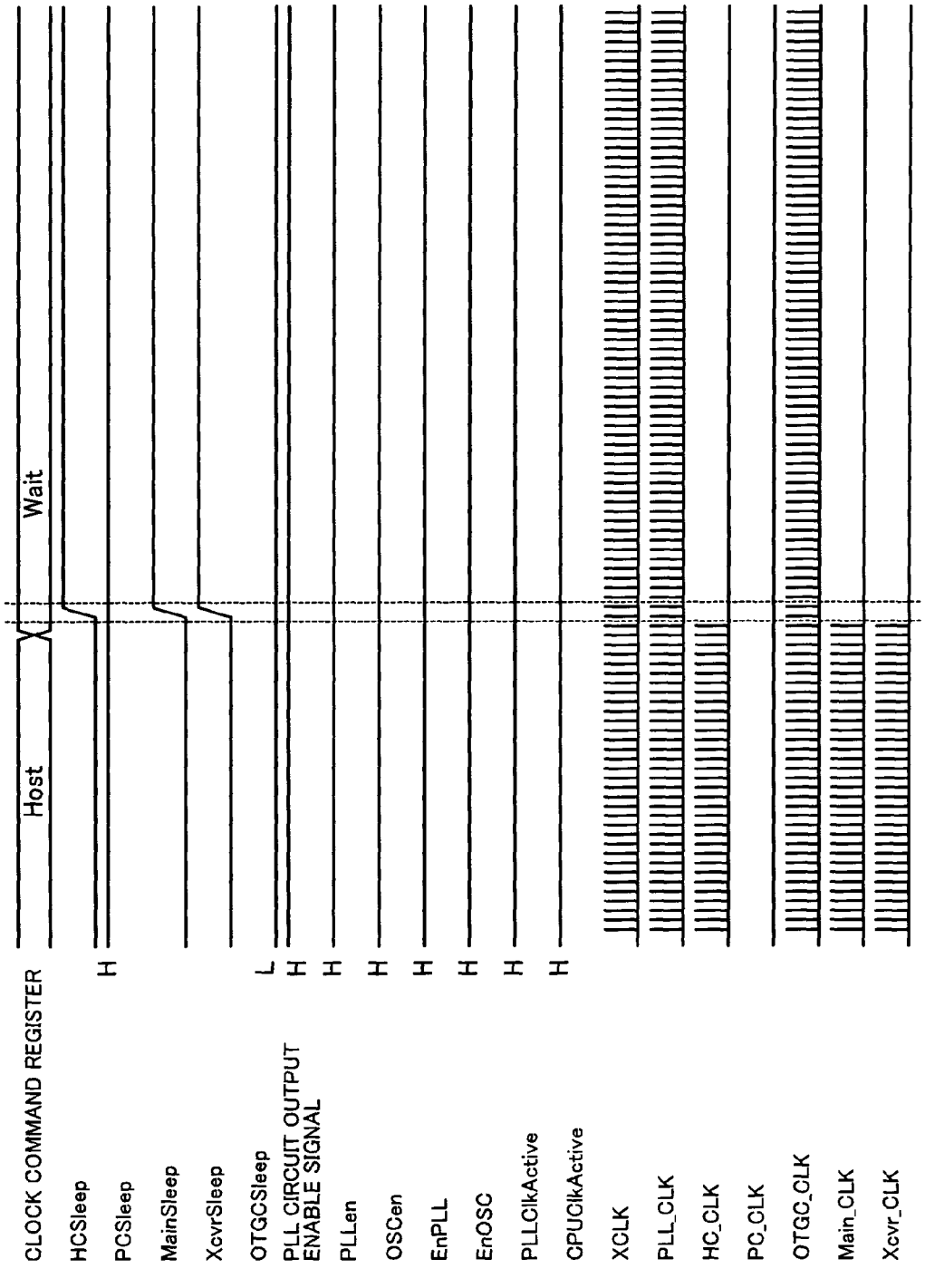
FIG. 17 is a timing chart showing an example of operation timing of clock supply control when an A-device transitions from a host state to a suspend state.

FIG. 17 shows an example of the clock supply control operation timing when the A-device transitions from the host state to the suspend state. When the A-device transitions from the a_host state to the a_suspend state, a clock command corresponding to the Wait mode is set in the clock command register in which the clock command corresponding to the Host mode has been set by the firmware. This allows output of the HC clock HC_CLK, the transceiver clock Xcvr_CLK, and the main clock Main_CLK to be suspended.

Figure 18:
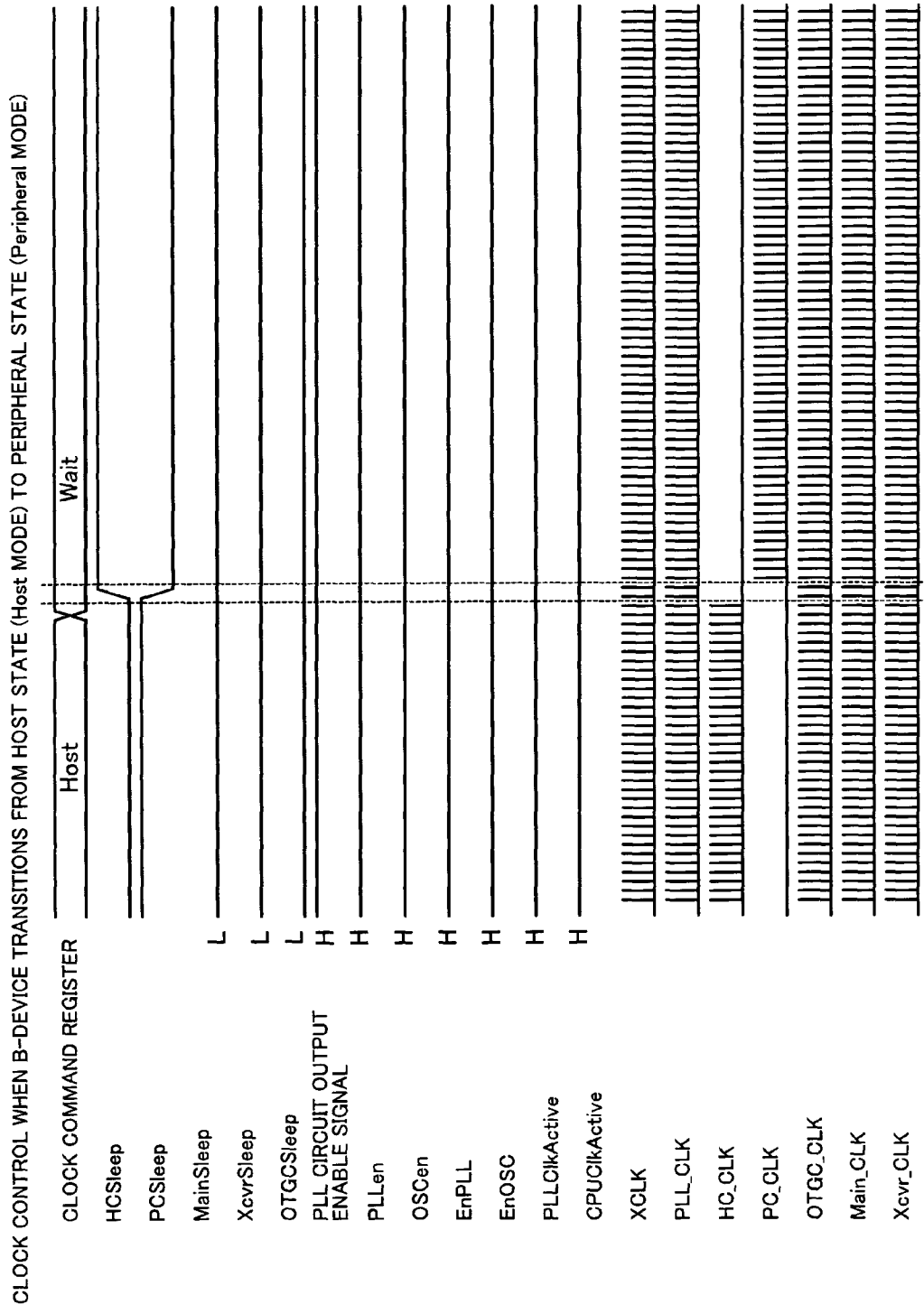
FIG. 18 is a timing chart showing an example of operation timing of clock supply control when a B-device transitions from a host state to a peripheral state.

FIG. 18 shows an example of the clock supply control operation timing when the B-device transitions from the host state to the peripheral state. When the B-device transitions from the b_host state to the b_peripheral state, a clock command corresponding to the Peripheral mode is set in the clock command register in which the clock command corresponding to the Host mode has been set by the firmware. This allows output of the HC clock HC_CLK to be suspended and output of the PC clock PC_CLK to be started.

Figure 19:
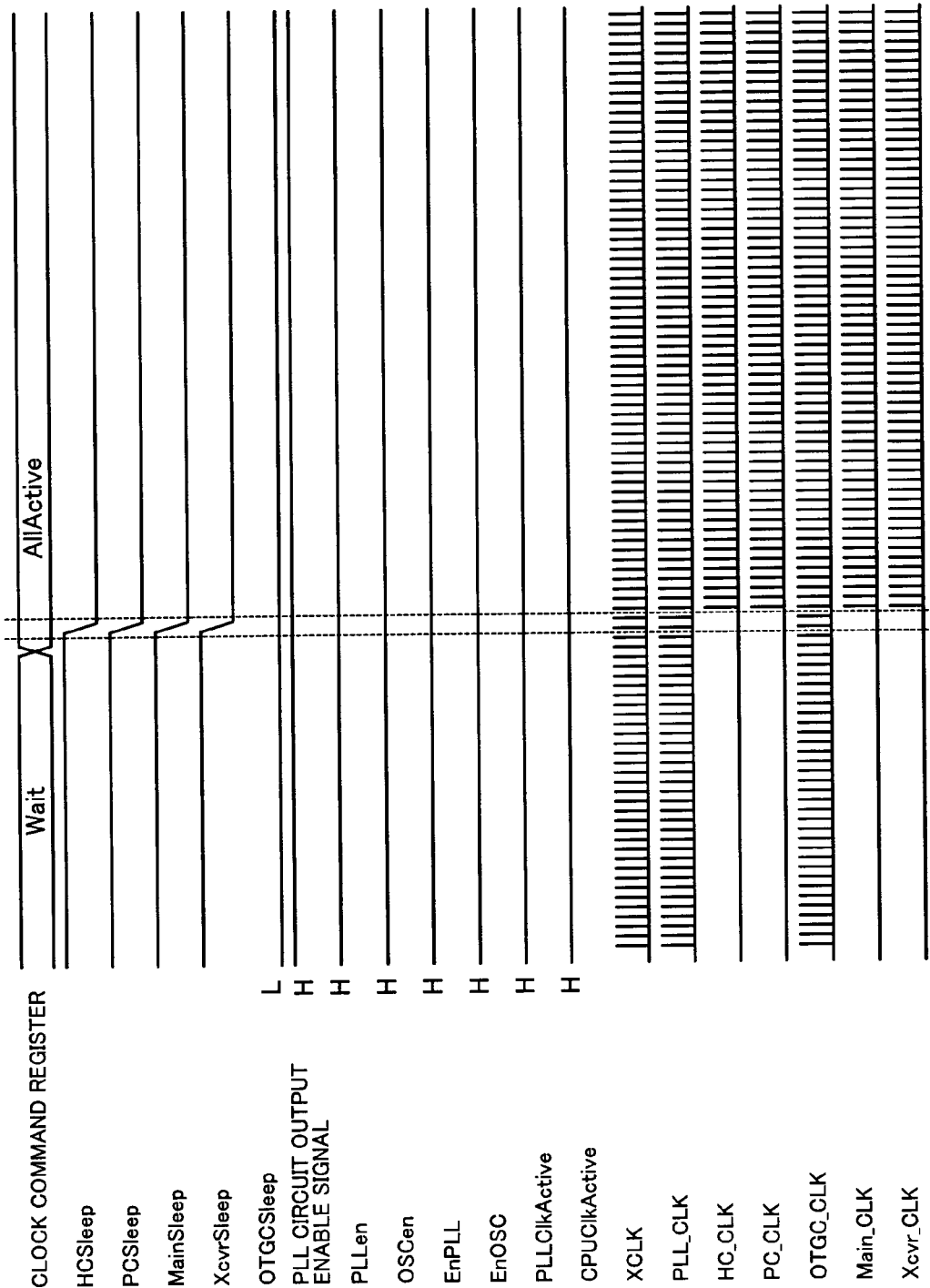
FIG. 19 is a timing chart showing an example of operation timing of clock supply control when an A-device transitions from an idle state to a test state.

FIG. 19 shows an example of the clock supply control operation timing when the A-device transitions from the idle state to the test state. In the A-device, a clock command corresponding to the AllActive mode is set in the clock command register in which the clock command corresponding to the Wait mode has been set by the firmware. This allows output of the HC clock HC_CLK, the PC clock PC_CLK, the transceiver clock Xcvr_CLK, and the main clock Main_CLK to be started.

Only the above-described five clock control patterns are not necessarily set in the clock command register. At least one of the oscillation circuit oscillation enable signal and the PLL circuit oscillation enable signal which control output of the oscillation circuit 312 and the PLL circuit 314 may be output by decoding the clock command.

Figure 20:
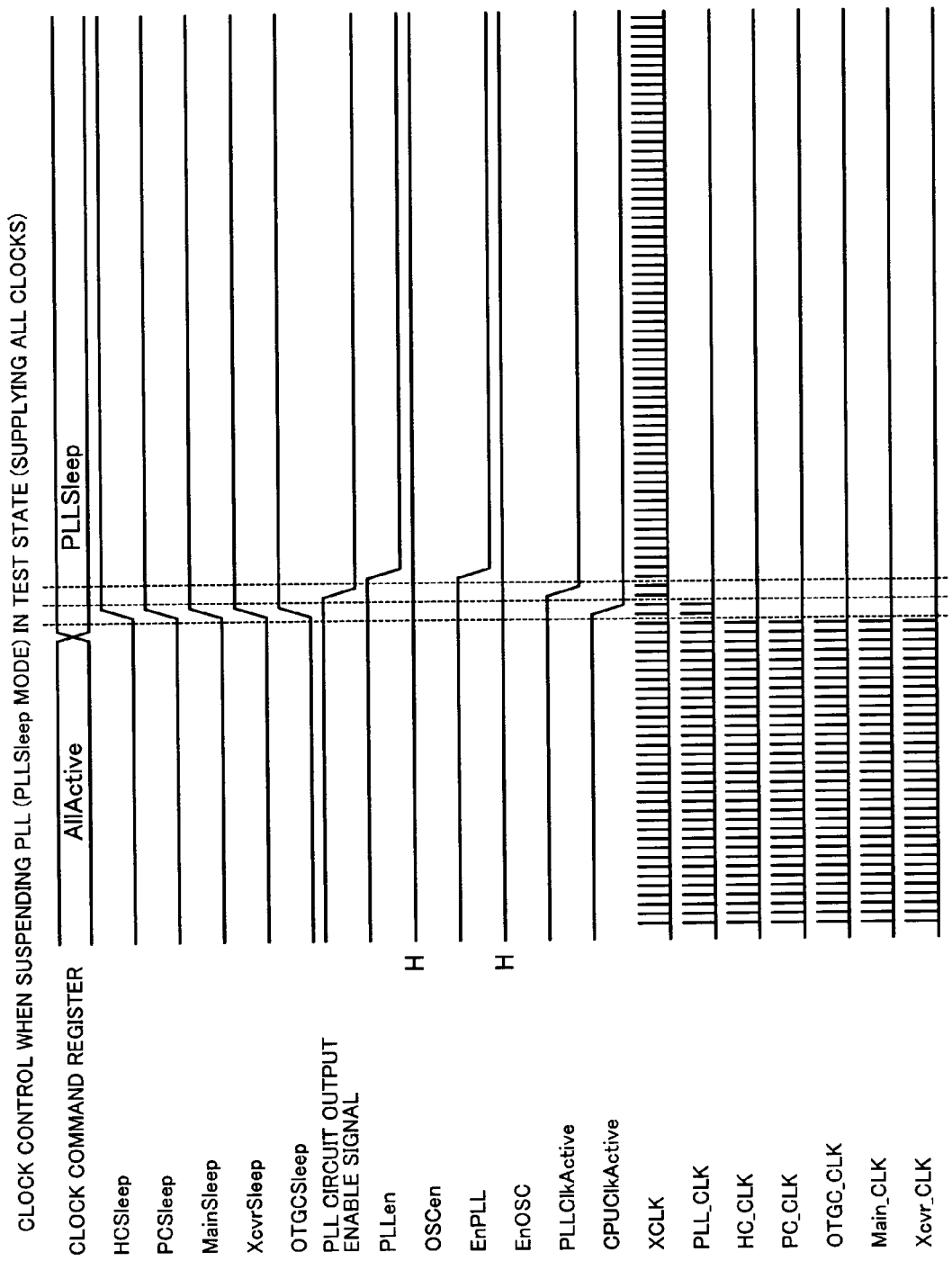
FIG. 20 is a timing chart showing an example of operation timing of clock supply control when suspending output of a PLL circuit in a test state.

FIG. 20 shows an example of the clock supply control operation timing when suspending output of the PLL circuit in the test state. A clock command for disabling the PLL circuit output enable signal is set in the clock command register in which the clock command corresponding to the AllActive mode has been set by the firmware. In this case, when the PLL circuit oscillation enable signal is disabled, the PLL circuit output enable signal is also disabled. Output of all the clocks excluding the oscillation output of the oscillation circuit 312 is suspended.

The clock command may be set at the same timing as the state command corresponding to the destination state, or may be set while providing a time lag between the clock command and the state command. The clock command may be set at an arbitrary timing in the destination state.

Figure 21:
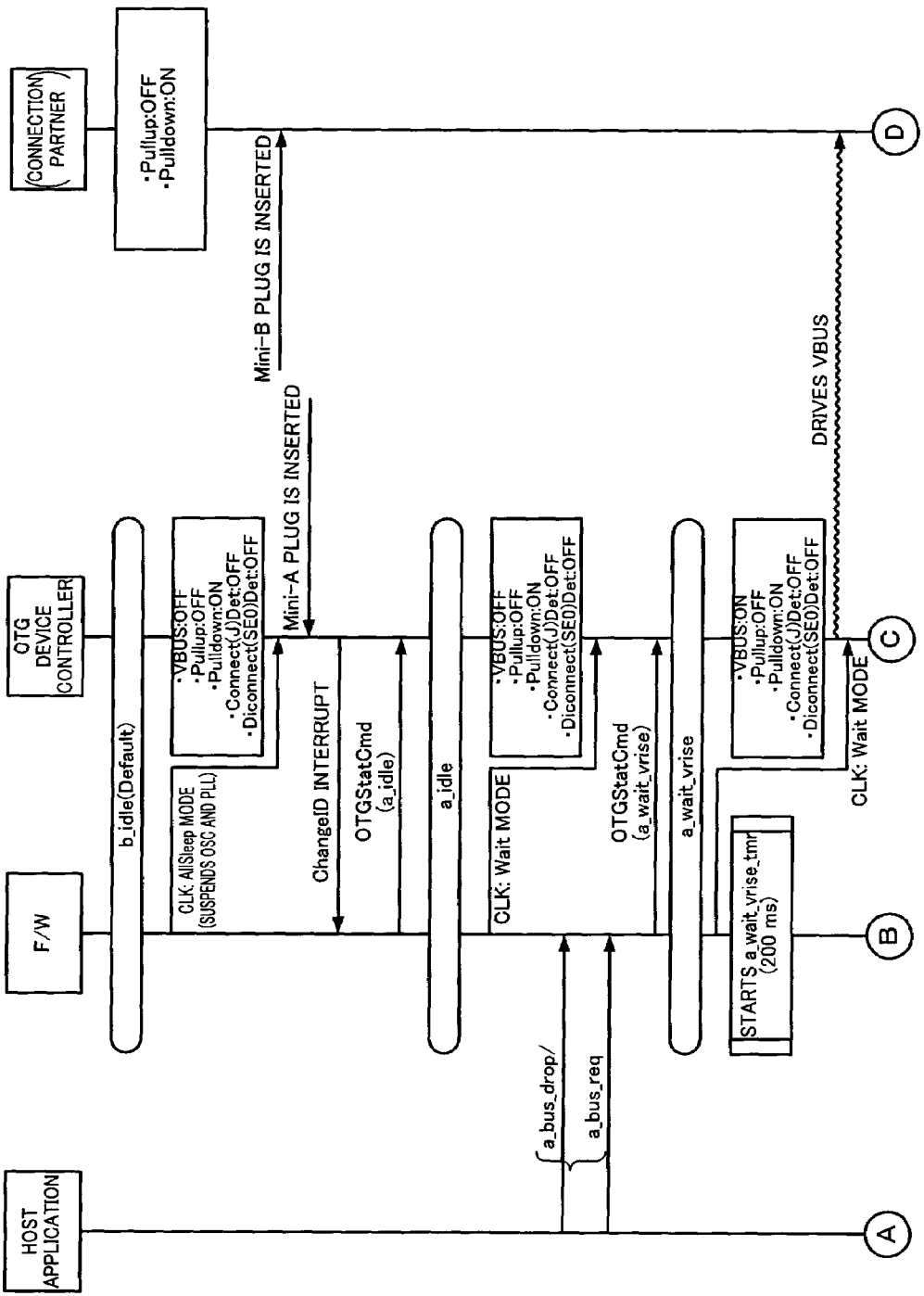
FIG. 21 is a sequence diagram showing a first half of an example of data transfer control using an OTG device controller IC 200.
Figure 22:
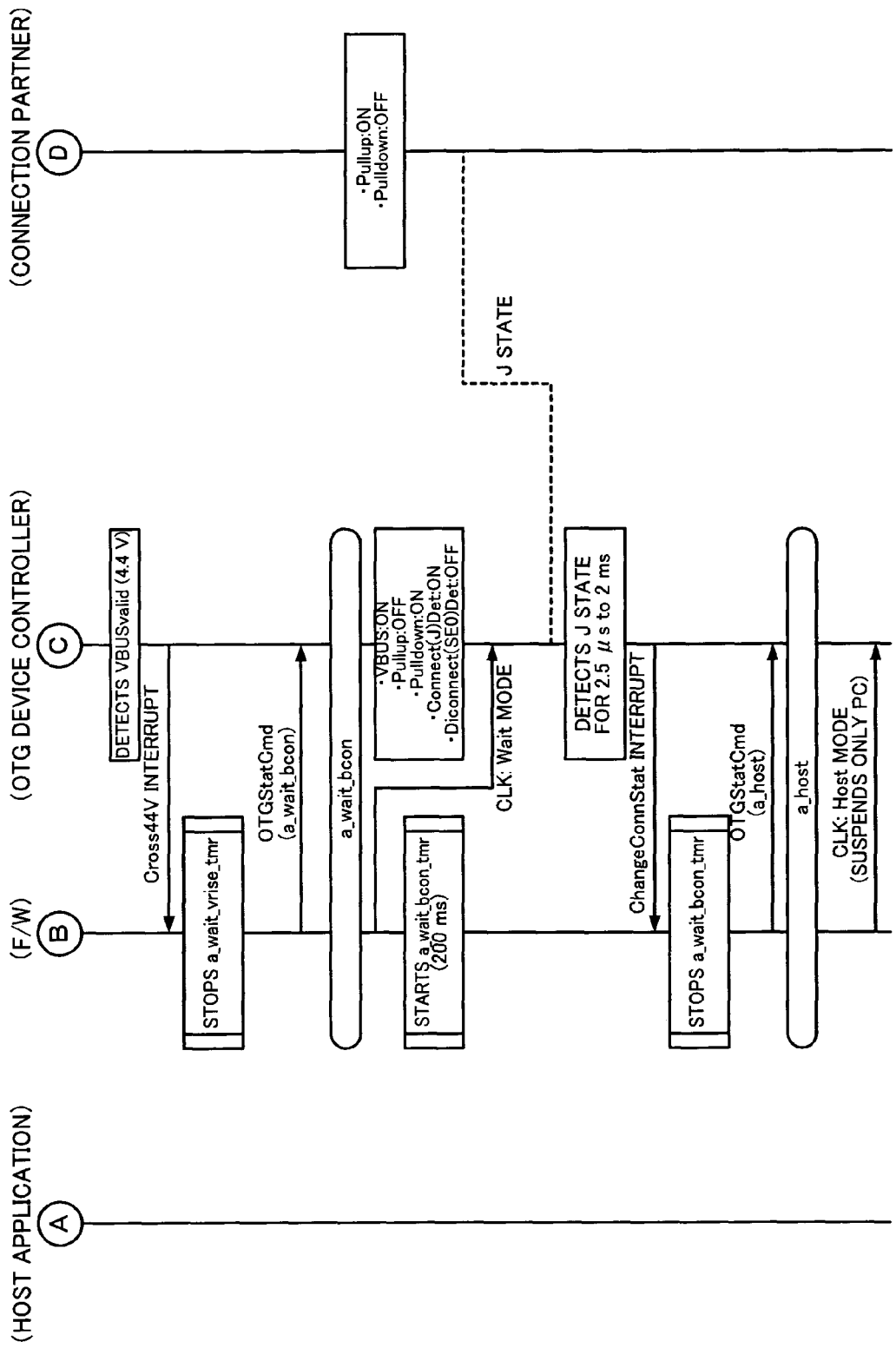
FIG. 22 is a sequence diagram showing the latter half of an example of data transfer control using an OTG device controller IC 200.

FIGS. 21 and 22 show an example of data transfer control using the OTG device controller IC 200 to which the above clock control circuit is applied to the clock controller.

FIGS. 21 and 22 illustrate firmware processing and communication with a connection partner performed when the A-device transitions from the b_idle state (default) to the a_host state.

Connect(J)Det refers to a function of detecting in which the line state is in the "J" state so as to detect connection with the connection partner. Disconnect(SE0)Det refers to a function of detecting in which the line state is in the "SE0" state so as to detect disconnection from the connection partner.

The dual-role device defaults to the b_idle state as described above. A clock command corresponding to the AllSleep mode is set in the clock command register by the CPU (firmware). This allows output of all the clocks to be suspended as shown in FIG. 15.

When a Mini-B plug is inserted into the connection partner and a Mini-A plug is inserted into the OTG device controller IC 200, the CPU (firmware) is notified of a ChnageID interrupt which indicates that the ID signal is changed. The interrupt signal of which the CPU is notified is controlled to be deactivated by the CPU.

The CPU judges that the destination state is the a_idle state as shown in FIG. 5, and sets the OTG state command. Therefore, each block of the OTG device controller IC 200 is controlled based on the control signal in the a_idle state. The CPU judges that the clock control pattern in the a_idle state is the Wait mode as shown in FIG. 13, and sets a clock command corresponding to the Wait mode in the clock command register. This allows only the OTGC clock OTGC_CLK to be output and supplied to the OTG controller 210, the CPU interface 290, and the host/peripheral switch circuit 270.

When the host application requests use of the bus (a_bus_req), the CPU judges that the destination state is the a_wait_vrise state and sets the OTG state command. The CPU judges that the clock control pattern in the a_wait_vrise state is the Wait mode as shown in FIG. 13, and sets a clock command corresponding to the Wait mode in the clock command register. In this case, the output state of each clock remains the same as in the a_idle state.

When a state command corresponding to the a_wait_vrise state is set and the A-device transitions to the a_wait_vrise state, the CPU starts a 200-ms timer. When the voltage of VBUS is detected to rise above the given threshold voltage, the CPU stops the timer in the a_wait_vrise state by the Cross44V interrupt, judges that the destination state is the a_wait_bcon state, and sets the OTG state command. In the case where the timer has timed out (200 ms has elapsed), the CPU also judges that the destination state is the a_wait_bcon state and sets the OTG state command corresponding to the a_wait_bcon state. The CPU judges that the clock control pattern in the a_wait_bcon state is the Wait mode as shown in FIG. 13, and sets a clock command corresponding to the Wait mode in the clock command register. In this case, the output state of each clock remains the same as in the a_wait_vrise state.

When the A-device transitions to the a_wait_bcon state, the CPU starts a 200-ms timer. When the line state is detected to be in the "J" state for a predetermined period of time, the CPU stops the timer by a ChangeConnStat interrupt, judges that the destination state is the a_host state, and sets the OTG state command. The CPU judges that the clock control pattern in the a_host state is the Host mode as shown in FIG. 13, and sets a clock command corresponding to the Host mode in the clock command register. This allows output of the HC clock HC_CLK, the main clock Main_CLK, and the transceiver clock Xcrv_CLKd to be started, as shown in FIG. 16.

3.5 Another Configuration Example

The clock control circuit does not necessarily set a clock command corresponding to all the clock control patterns as shown FIG. 14. It suffices that the clock control circuit can set a clock command corresponding to at least one clock control pattern.

Figure 23:
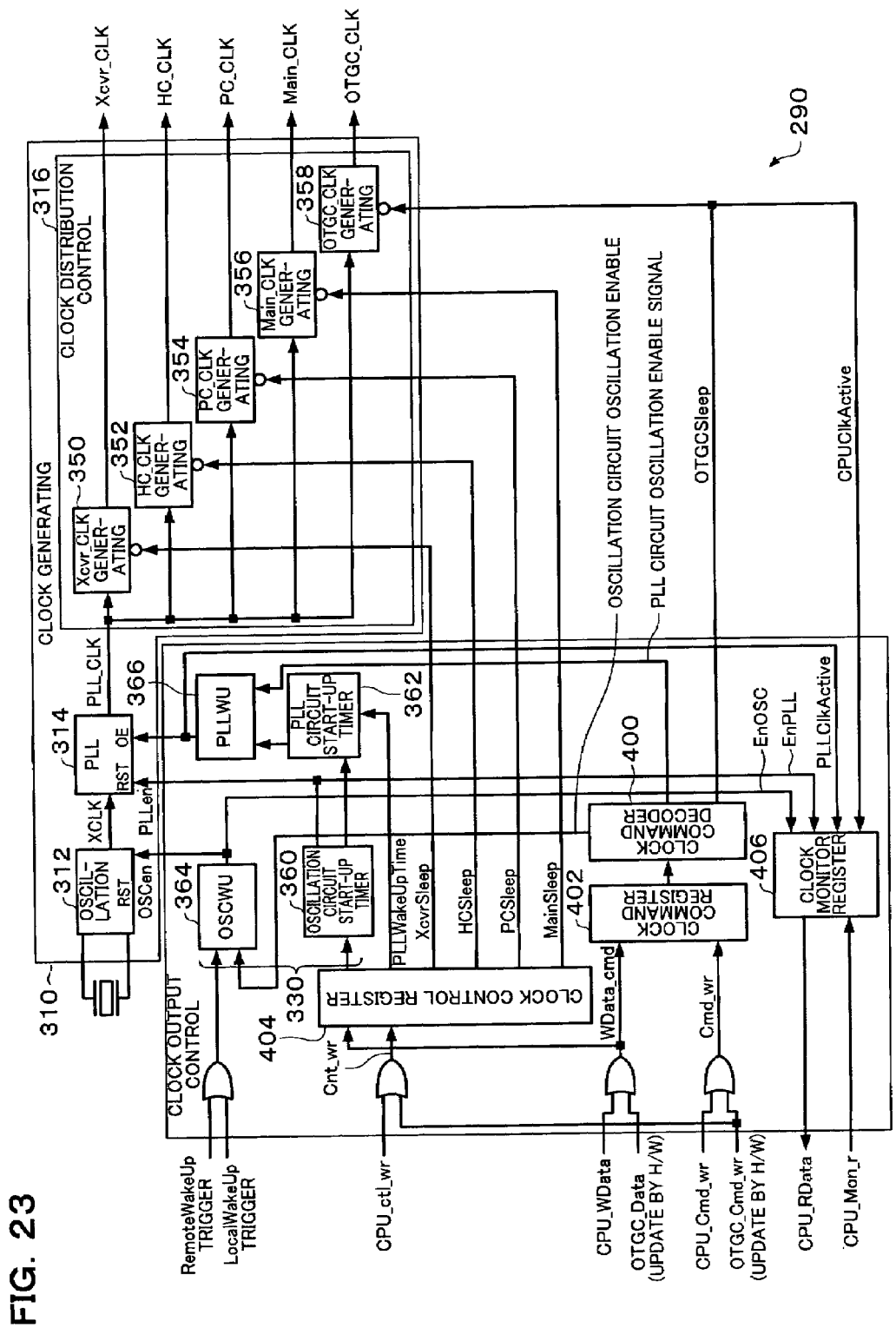
FIG. 23 is a circuit diagram showing another detailed example of a clock controller.

FIG. 23 shows another configuration example of the clock controller shown in FIG. 14.

A clock command decoder 400 decodes a clock command set in a clock command register 402 and generates an output control signal. In FIG. 23, OTGCSleep (clock distribution control signal), the oscillation circuit oscillation enable signal, and the PLL circuit oscillation enable signal are generated as the output control signals.

Clock control data is set in a clock control register 404 by the firmware or hardware such as the OTG controller 210. In a clock controller 390, an oscillation circuit wakeup time OSCWakeUpTime [1:0] as the number of oscillation waits, a PLL circuit wakeup time PLLWakeUpTime [1:0] as the number of PLL oscillation waits, and the clock distribution control signals XcvrSleep, HCSleep, PCSleep, and MainSleep which control clock supply for every circuit block are set in the clock control register, as shown in FIG. 24.

A clock command is set in the clock command register 402 by the firmware or hardware such as the OTG controller 210, as shown in FIG. 24.

The presence or absence of supply of the OTGC clock OTGC_CLK, the presence or absence of output of the PLL clock PLL_CLK, enable/disable EnPLL of the PLL circuit, and enable/disable EnOSC of the oscillation circuit are set in the clock monitor register 406, as shown in FIG. 24.

The processing can be simplified and unnecessary power consumption can be prevented by controlling clock supply by using at least one clock control pattern. Moreover, clock supply can be controlled in more detail by controlling clock supply for every control block by using the clock control register in combination.

FIGS. 25 to 30 show examples of operation timing of the clock controller 390.

The following description is given on the assumption that clock control is OSC wakeup when the clock command is "55h", OSC sleep when "aah", PLL wakeup when "3ch", PLL sleep when "c3h", OTGC_CLK wakeup when "69h", and OTGC_CLK sleep when "96h", for example.

Figure 25:
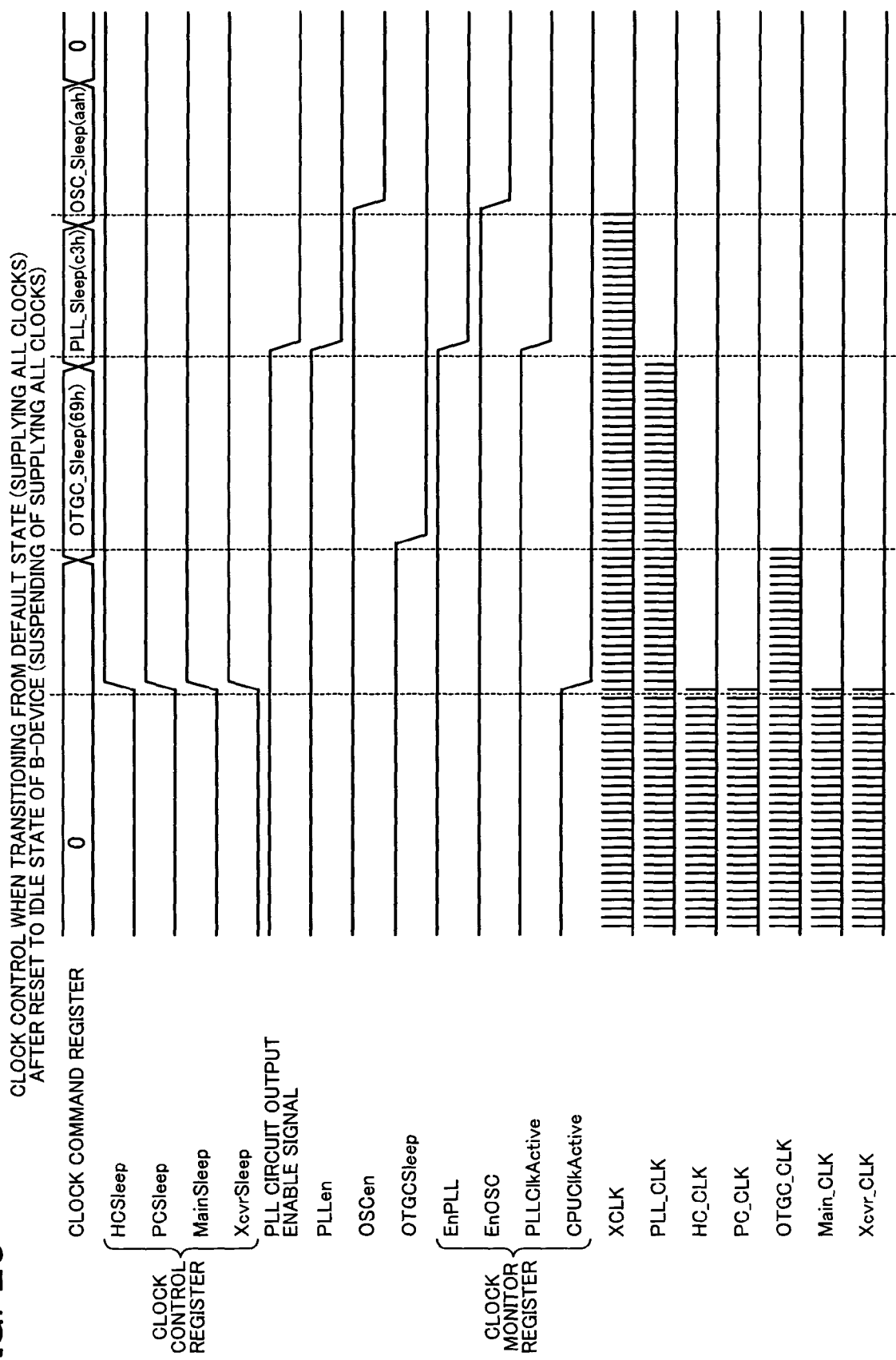
FIG. 25 is a timing chart showing an example of operation timing of clock supply control when transitioning from a default state after reset to an idle state of a B-device.

FIG. 25 shows an example of the clock supply control operation timing when transitioning from the default state after reset to the idle state of the B-device. When the clock controller 390 is reset, "00h" is set in the clock command register 402, whereby all the clocks are output. The CPU (firmware) sets the clock distribution control signals Xcvr_Cleep, HCSleep, PCSleep, and MainSleep at an "H" level by using the clock control register 404, whereby output of the HC clock HC_CLK, PC clock PC_CLK, the main clock Main_CLK, and the transceiver clock Xcvr_CLK is suspended.

When entering the idle state of the B-device, the firmware sequentially sets "69h", "c3h", "aah", and "00h" in the clock command register 402 to allow output of the OTGC clock OTGC_CLK, the PLL clock PLL_CLK, and the oscillation clock XCLK to be suspended in that order.

Figure 26:
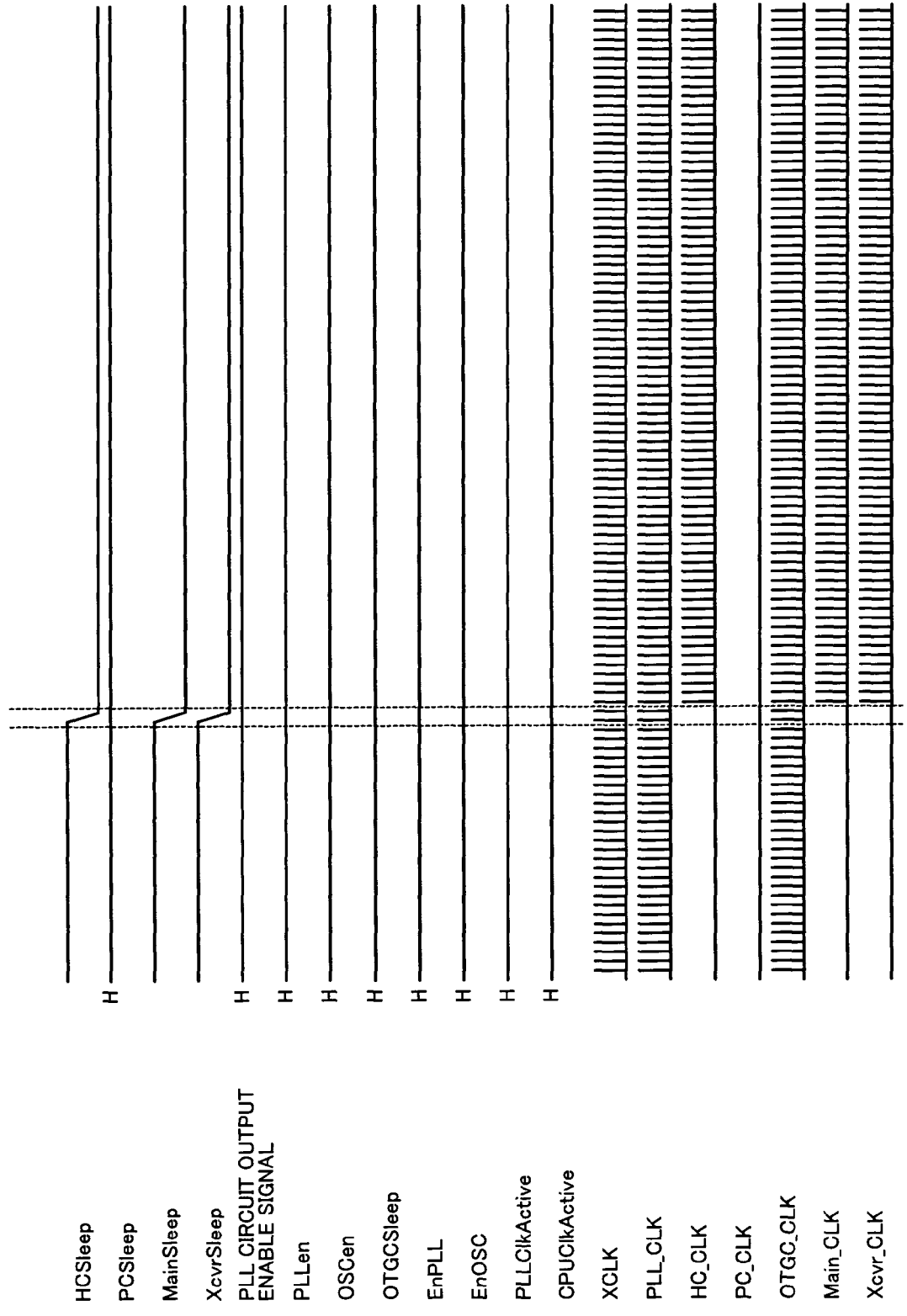
FIG. 26 is a timing chart showing an example of operation timing of clock supply control when an A-device transitions from a B-device detection wait state to a host state.

FIG. 26 shows an example of the clock supply control operation timing when the A-device transitions from the B-device detection wait state to the host state. When the A-device transitions from the a_wait_bcon state to the a_host state, output of the HC clock HC_CLK, the transceiver clock Xcvr_CLK, and the main clock Main_CLK is started by the firmware by using the clock control register 404. Since only the PC clock PC_CLK is not supplied, power consumption can be reduced in the a_host state.

Figure 27:
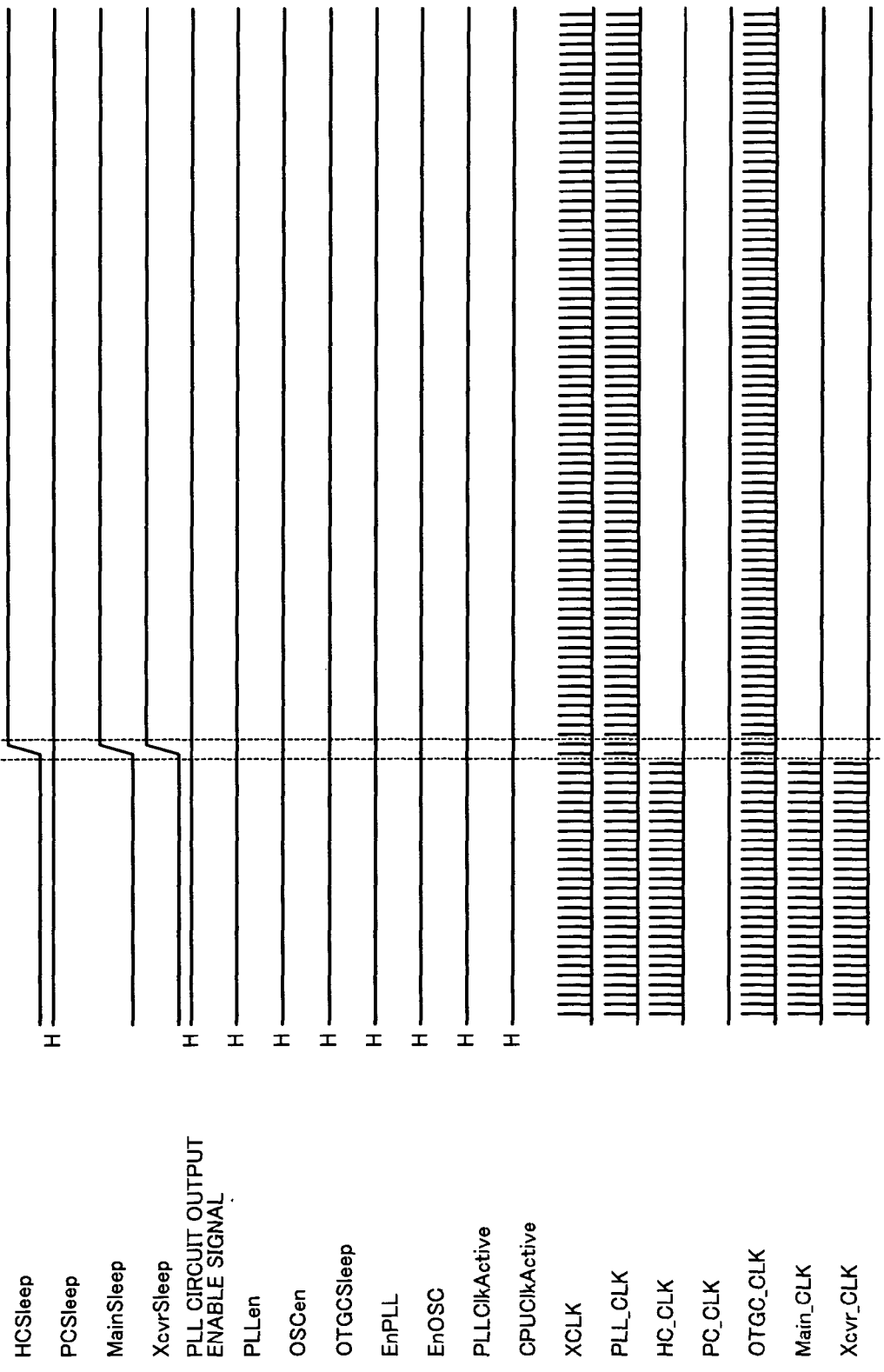
FIG. 27 is a timing chart showing an example of operation timing of clock supply control when an A-device transitions from a host state to a suspend state.

FIG. 27 shows an example of the clock supply control operation timing when the A-device transitions from the host state to the suspend state. When the A-device transitions from the a_host state to the a_suspend state, the firmware sets the clock distribution control signals HCSleep, MainSleep, and XcvrSleep at an "H" level by using the clock control register 404, whereby output of the HC clock HC_CLK, the transceiver clock Xcvr_CLK, and the main clock Main_CLK is suspended. Since only the OTGC clock OTGC_CLK is supplied, power consumption can be reduced in the a_suspend state.

Figure 28:
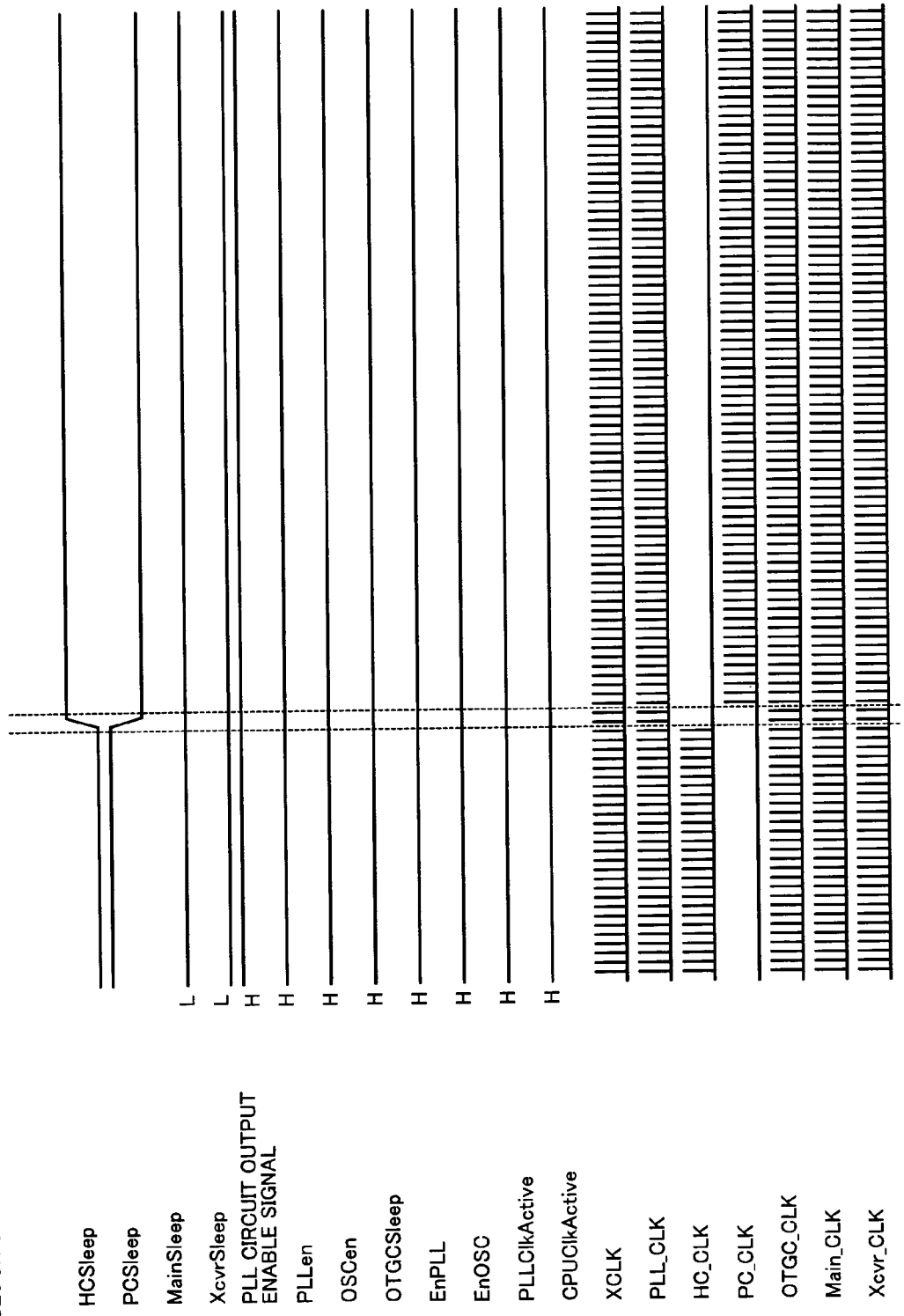
FIG. 28 is a timing chart showing an example of operation timing of clock supply control when a B-device transitions from a host state to a peripheral state.

FIG. 28 shows an example of the clock supply control operation timing when the B-device transitions from the host state to the peripheral state. When the B-device transitions from the b_host state to the b_peripheral state, the firmware sets the clock distribution control signal HCSleep at an "H" level by using the clock control register 404 to allow output of the HC clock HC_CLK to be suspended, and sets the clock distribution control signal PCSleep at an "L" level to allow output of the PC clock PC_CLK to be started. Since supply of the HC clock HC_CLK is suspended in the b_peripheral state, power consumption can be reduced.

Figure 29:
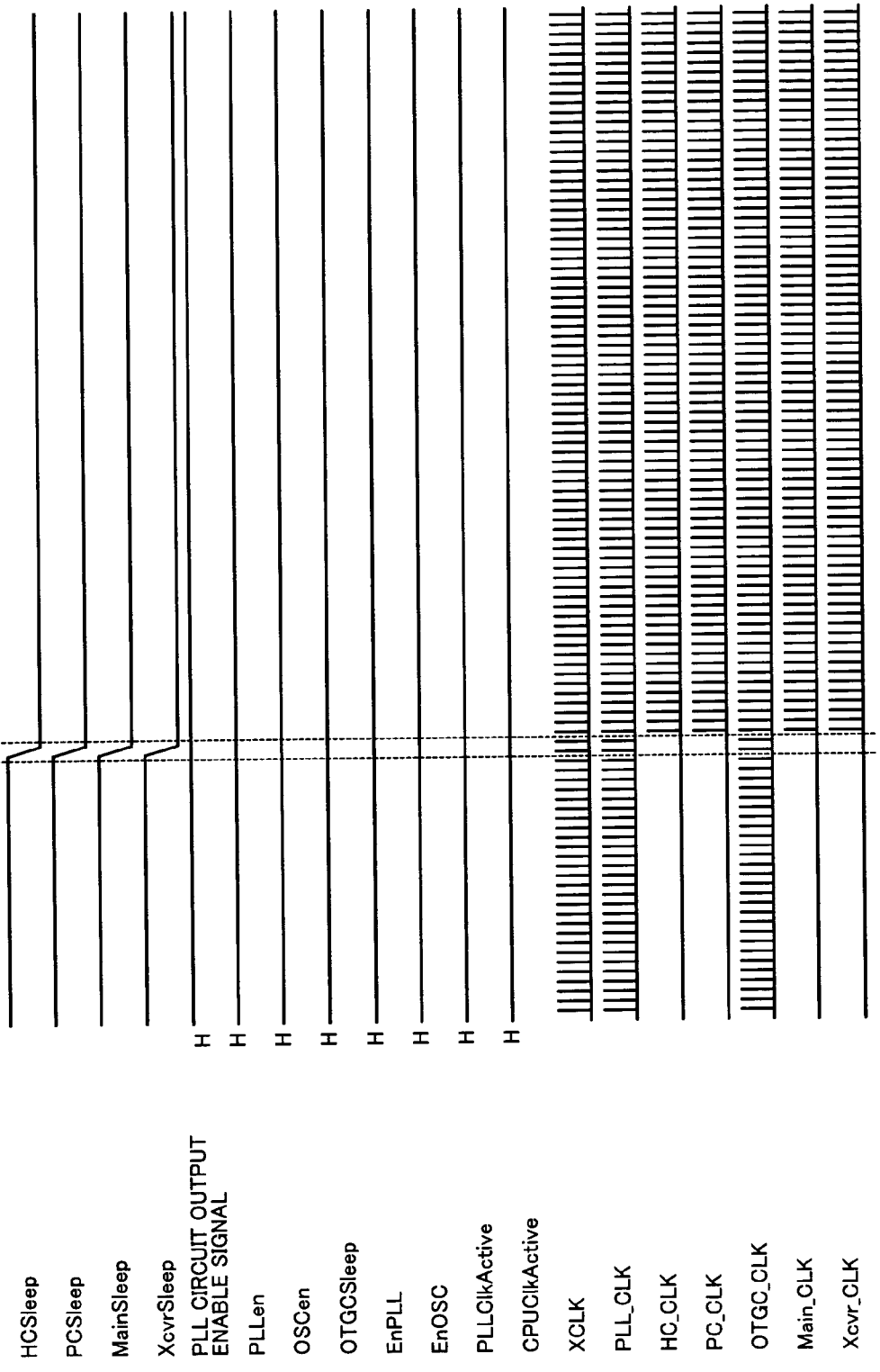
FIG. 29 is a timing chart showing an example of operation timing of clock supply control when an A-device transitions from an idle state to a test state.

FIG. 29 shows an example of the clock supply control operation timing when the A-device transitions from the idle state to the test state. When the A-device transitions to the test state, the firmware sets the clock distribution control signals HCSleep, PCSleep, MainSleep, and XcvrSleep at an "L" level by using the clock control register 404, whereby output of the HC clock HC_CLK, the PC clock PC_CLK, the transceiver clock Xcvr_CLK, and the main clock Main_CLK is started. This enables each functional block to be tested while reducing power consumption.

Figure 30:
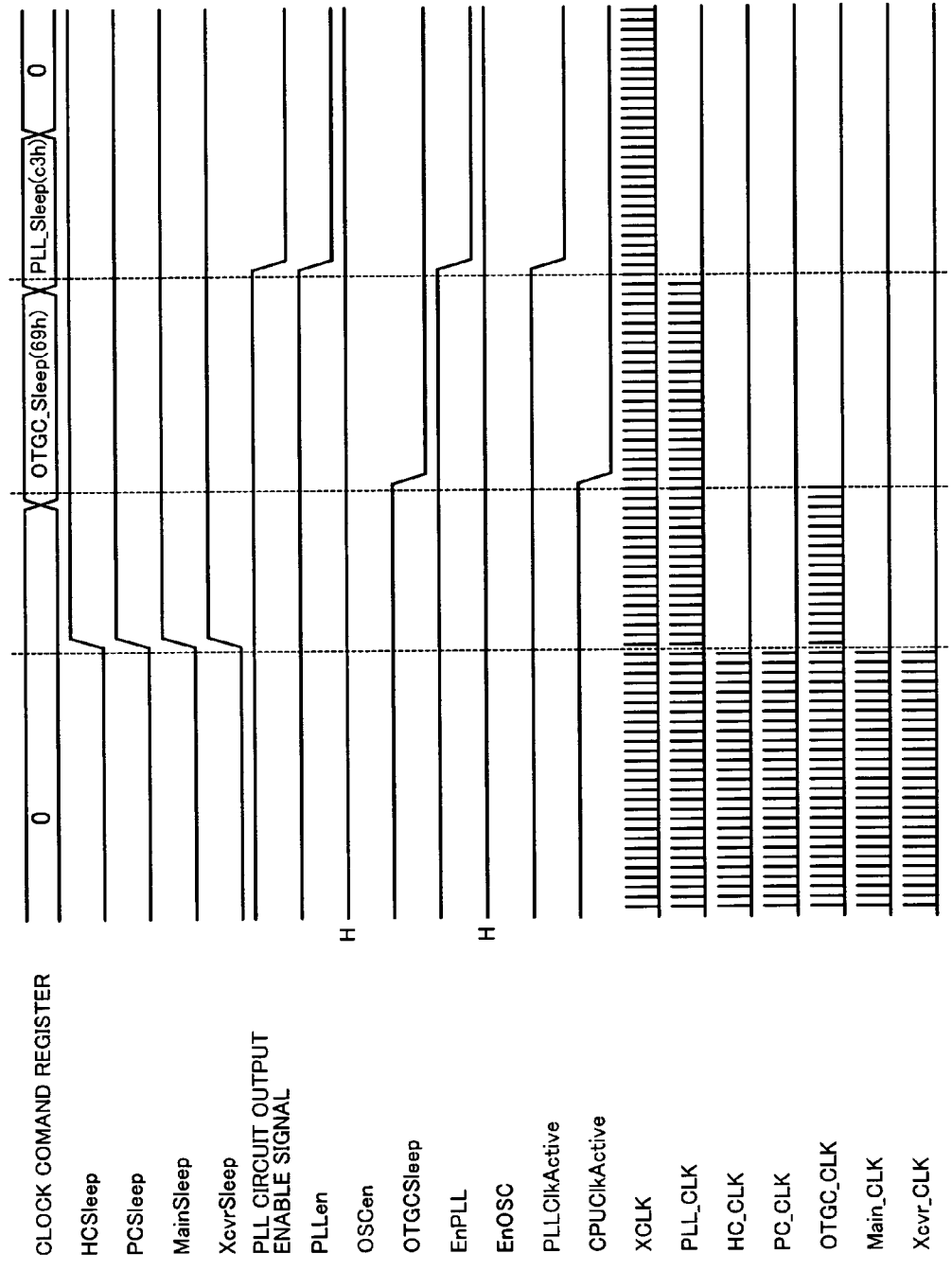
FIG. 30 is a timing chart showing an example of operation timing of clock supply control when suspending output of a PLL circuit in a test state.

FIG. 30 shows an example of the clock supply control operation timing when suspending output of the PLL circuit in the test state. In the test state, "00h" is set in the clock command register 402 of the clock controller 390 by the firmware, whereby all the clocks are output. In the case of suspending the PLL circuit thereafter, the CPU (firmware) sets the clock distribution control signals HCSleep, PCSleep, MainSleep, and Xcvr_Cleep at an "H" level by the using clock control register 404, whereby output of the HC clock HC_CLK, PC clock PC_CLK, the main clock Main_CLK, and the transceiver clock Xcvr_CLK is suspended.

The firmware then sequentially sets "69h", "c3h", and "00h" in the clock command register 402 to allow output of the OTGC clock OTGC_CLK, the PLL clock PLL_CLK, and the oscillation clock XCLK to be suspended in that order.

4. Electronic Equipment

Examples of electronic equipment including a data transfer control device to which the clock control circuit of the present embodiment is applied are described below.

Figure 31A:
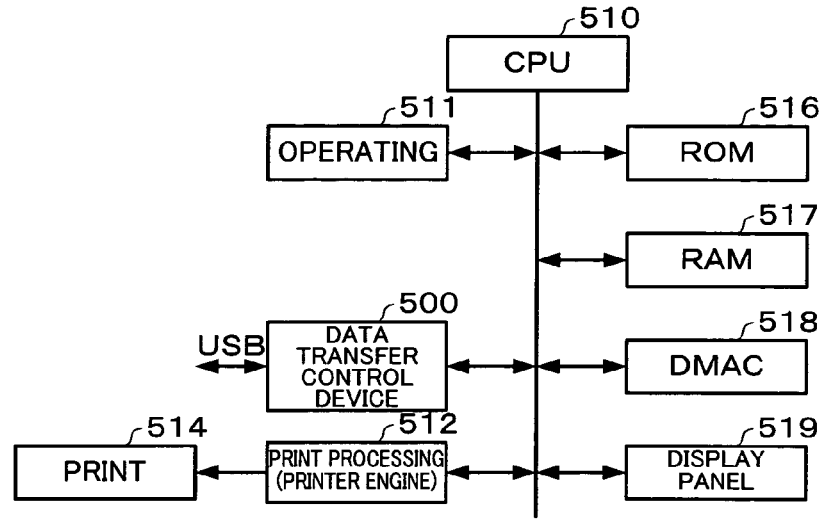
FIGS. 31A, 31B, and 31C show examples of internal block diagrams of various types of electronic equipment.
Figure 32A:
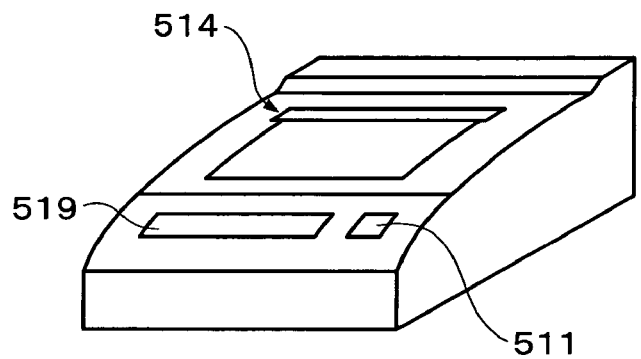
FIGS. 32A, 32B, and 32C show examples of external views of various types of electronic equipment.

FIG. 31A is an internal block diagram of a printer which is an example of the electronic equipment. FIG. 32A is an external view of the printer. A CPU (microcomputer) 510 controls the entire system and the like. An operating section 511 allows the user to operate the printer. A control program, fonts, and the like are stored in a ROM 516. A RAM 517 functions as a work area for the CPU 510. A DMAC 518 is a DMA controller for transferring data without the CPU 510. A display panel 519 notifies the user of the operation state of the printer.

Serial print data sent from another device such as a personal computer through the USB is converted into parallel print data by a data transfer control device 500. The converted parallel print data is sent to a print processing section (printer engine) 512 by the CPU 510 or the DMAC 518. The parallel print data is subjected to given processing in the print processing section 512 and output and printed on paper by a print section (device which performs output processing of data) 514 consisting of a print head and the like.

Figure 31B:
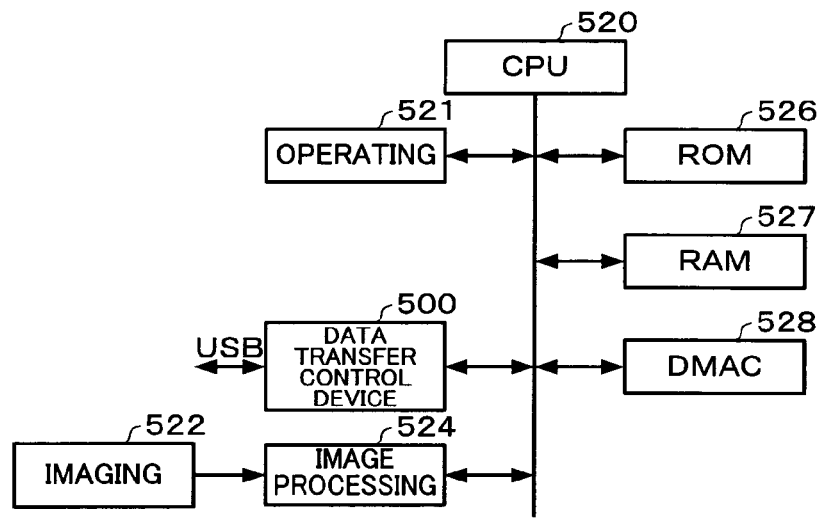
Figure 32B:
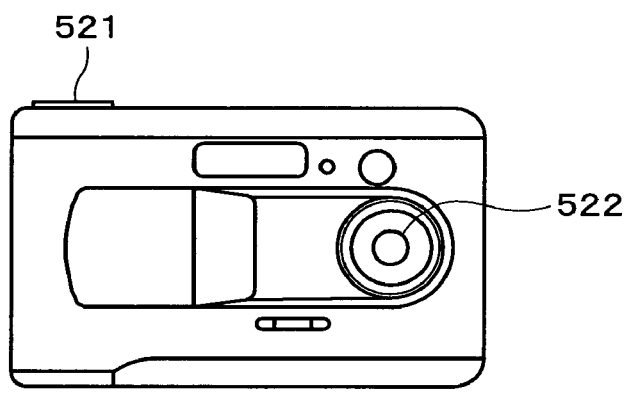

FIG. 31B is an internal block diagram of a digital camera which is another example of electronic equipment. FIG. 32B is an external view of the digital camera. A CPU 520 controls the entire system and the like. An operating section 521 allows the user to operate the digital camera. A control program and the like are stored in a ROM 526. A RAM 527 functions as a work area for the CPU 520. A DMAC 528 is a DMA controller.

An image of an object is taken by an imaging section 522 consisting of a CCD and the like. The image data is processed by an image processing section 524. The processed image data is sent to the data transfer control device 500 by the CPU 520 or the DMAC 528. The data transfer control device 500 converts the parallel image data into serial data and sends the serial data to another device such as a personal computer through the USB.

Figure 31C:
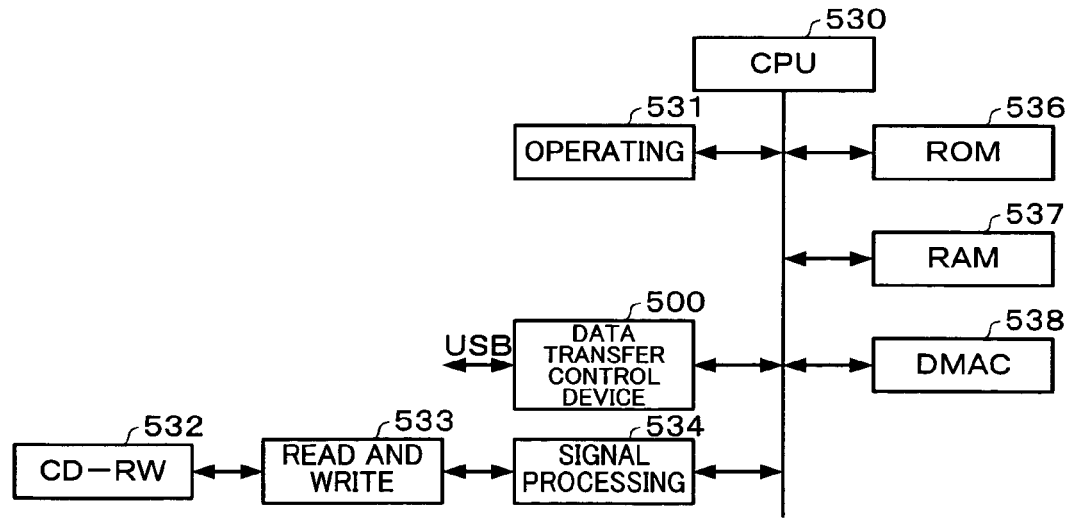
Figure 32C:
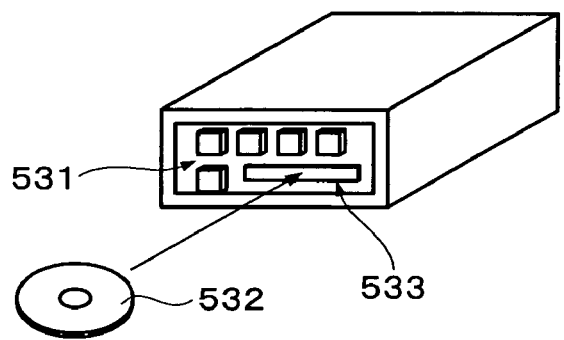

FIG. 31C is an internal block diagram of a CD-RW drive which is still another example of electronic equipment. FIG. 32C is an external view of the CD-RW drive. A CPU 530 controls the entire system and the like. An operating section 531 allows the user to operate the CD-RW. A control program and the like are stored in a ROM 536. A RAM 537 functions as a work area for the CPU 530. A DMAC 538 is a DMA controller.

Data read from a CD-RW 532 by a read/write section (device which performs fetch processing or storage processing of data) 533 consisting of a laser, motor, optical system, and the like is input to a signal processing section 534 and subjected to given signal processing such as error correction processing. The data subjected to the signal processing is sent to the data transfer control device 500 by the CPU 530 or the DMAC 538. The data transfer control device 500 converts the parallel data into serial data and sends the serial data to another device such as a personal computer through the USB.

Serial data sent from another device through the USB is converted into parallel data by the data transfer control device 500. The parallel data is sent to the signal processing section 534 by the CPU 530 or the DMAC 538. The parallel data is subjected to given signal processing in the signal processing section 534 and stored on the CD-RW 532 by the read/write section 533.

In FIGS. 31A, 31B, and 31C, another CPU for controlling data transfer by the data transfer control device 500 may be provided in addition to the CPU 510, 520 or 530.

USB transfer can be performed without connecting the electronic equipment with a personal computer which performs the host operation by providing the data transfer control device of the present embodiment in electronic equipment. In particular, it is made unnecessary for the user to carry a personal computer by providing the data transfer control device in portable electronic equipment, whereby USB transfer can be readily performed. For example, USB transfer can be performed between a printer or a CD-RW without using a personal computer.

A processing load of firmware which operates on the CPU is reduced by providing the data transfer control device of the present embodiment in electronic equipment, whereby an inexpensive CPU can be used. Moreover, since cost and scale of the data transfer control device can be reduced, cost and scale of the electronic equipment can also be reduced.

As other examples of electronic equipment to which the data transfer control device of the present embodiment can be applied, various types of optical disk drives (CD-ROM and DVD), magneto-optical disk drives (MO), hard disk drives, TVs, VTRs, video cameras, audio equipment, telephones, projectors, personal computers, electronic notebooks, word processors, and the like can be given.

The present invention is not limited to the present embodiment. Various modifications and variations are possible within the spirit and scope of the present invention.

The present invention is particularly preferably applied to data transfer according to the OTG standard. However, the application of the present invention is not limited thereto. For example, the present invention may be applied to data transfer in a standard based on the same idea as the OTG standard and a standard developed from the OTG standard.

The method of dividing the OTG device controller IC into circuit blocks is not limited to the method of dividing the OTG device controller IC into the above-described functional blocks. The OTG device controller IC may be appropriately divided into a plurality of circuit blocks depending on the operating frequency, layout arrangement, and circuit scale of each functional block of the OTG device controller IC.

The above embodiment illustrates a case where clock supply is controlled by the clock control patterns shown in FIG. 13 as data transfer of the OTG standard. However, the present invention is not limited thereto. Clock supply can be controlled in more detail by providing a larger number of clock control patterns.

The above embodiment illustrates a case where a device into which a Mini-A plug is inserted before transfer is an A-device and a device into which a Mini-B plug is inserted is a B-device. However, the present invention may also be applied to a case where the supply source of VBUS is changed by exchanging the A-device and the B-device during transfer control.

What is claimed is:

1. A clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:
a clock generating circuit which generates a clock for every circuit block of the data transfer control device; and
a clock output control circuit which generates an output control signal which controls output of the clock for every circuit block,
wherein the clock output control circuit suspends output of the clock to be supplied to the state controller or reduces a clock frequency based on the output control signal in an idle state of the second device, and
wherein the clock output control circuit supplies the clock to the state controller based on the output control signal in an idle state of the first device.

2. The clock control circuit as defined in claim 1, wherein the clock output control circuit omits the control of clock output to the state controller in the state transition of the first device.

3. The clock control circuit as defined in claim 1, wherein the clock output control circuit suspends output of the clock to be supplied to a host controller which controls host operation or reduces the clock frequency, and also the clock output control circuit suspends output of the clock to be supplied to a peripheral controller which controls peripheral operation or reduces the clock frequency in an idle state of the second device.

4. The clock control circuit as defined in claim 1, wherein:
the clock output control circuit suspends output of the clock to be supplied to a host controller which controls host operation or reduces the clock frequency based on the output control signal when the data transfer control device operates as a peripheral; and
the clock output control circuit suspends output of the clock to be supplied to a peripheral controller which controls peripheral operation or reduces the clock frequency based on the output control signal when the data transfer control device operates as a host.

5. The clock control circuit as defined in claim 1, wherein the clock output control circuit generates the output control signal based on a clock control pattern which indicates whether or not to suspend output of every clock supplied to each circuit block of the data transfer control device, or whether or not to reduce the clock frequency.

6. The clock control circuit as defined in claim 5, wherein:
the clock output control circuit has a clock command register in which a clock command corresponding to the clock control pattern is set, and a clock monitor register for monitoring contents in the clock command register; and
the output control signal is generated based on decoding results of the clock command in the clock command register.

7. The clock control circuit as defined in claim 6, wherein the clock command is generated according to a state transitioned by the state controller.

8. The clock control circuit as defined in claim 1, wherein:
the first device is the A-device in the Universal Serial Bus (USB) On-The-Go (OTG) standard;
the second device is the B-device in the USB OTG standard; and
the state controller controls switching between the host state and the peripheral state according to the USB OTG standard.

9. A data transfer control device comprising:
the clock control circuit as defined in claim 1;
a state controller which controls switching between a host state and a peripheral state on the basis of state transition of a first device or a second device;
a host controller which controls host operation; and
a peripheral controller which controls peripheral operation.

10. Electronic equipment comprising:
the data transfer control device as defined in claim 9; and
a device which performs output processing, fetch processing, or storage processing of data transferred through the data transfer control device and a bus.

11. A clock control circuit of a data transfer control device having a state controller which controls switching between a host state and a peripheral state on the basis of state transition of a first device which operates as a host in a default state, or state transition of a second device which operates as a peripheral in a default state, the clock control circuit comprising:
a clock generating circuit which generates a clock for every circuit block of the data transfer control device; and
a clock output control circuit which generates an output control signal which controls output of the clock for every circuit block, wherein:
the clock output control circuit suspends output of the clock to be supplied to the state controller or reduces a clock frequency based on the output control signal when data transfer from a connection partner is suspended in the state transition of the second device as a peripheral; and
the clock output control circuit supplies the clock to the state controller in a suspend state of the first device.

12. The clock control circuit as defined in claim 11, wherein the clock output control circuit suspends output of the clock to be supplied to a peripheral controller which controls peripheral operation or reduces the clock frequency based on the output control signal in the suspend state of the first device.

13. The clock control circuit as defined in claim 11, wherein:
the clock output control circuit suspends output of the clock to be supplied to a host controller which controls host operation or reduces the clock frequency based on the output control signal when the data transfer control device operates as a peripheral; and
the clock output control circuit suspends output of the clock to be supplied to a peripheral controller which controls peripheral operation or reduces the clock frequency based on the output control signal when the data transfer control device operates as a host.

14. The clock control circuit as defined in claim 11, wherein the clock output control circuit generates the output control signal based on a clock control pattern which indicates whether or not to suspend output of every clock supplied to each circuit block of the data transfer control device, or whether or not to reduce the clock frequency.

15. The clock control circuit as defined in claim 14, wherein:
  the clock output control circuit has a clock command register in which a clock command corresponding to the clock control pattern is set, and a clock monitor register for monitoring contents in the clock command register; and
  the output control signal is generated based on decoding results of the clock command in the clock command register.

16. The clock control circuit as defined in claim 15, wherein the clock command is generated according to a state transitioned by the state controller.

17. The clock control circuit as defined in claim 11, wherein:
  the first device is the A-device in the Universal Serial Bus (USB) On-The-Go (OTG) standard;
  the second device is the B-device in the USB OTG standard; and
  the state controller controls switching between the host state and the peripheral state according to the USB OTG standard.

18. A data transfer control device comprising:
  the clock control circuit as defined in claim 11;
  a state controller which controls switching between a host state and a peripheral state on the basis of state transition of a first device or a second device;
  a host controller which controls host operation; and
  a peripheral controller which controls peripheral operation.

19. Electronic equipment comprising:
  the data transfer control device as defined in claim 18; and
  a device which performs output processing, fetch processing, or storage processing of data transferred through the data transfer control device and a bus.

* * * * *